Jan. 19, 1937.　　M. E. LANGE　　2,068,552
MACHINE TOOL
Filed Feb. 26, 1935　　8 Sheets-Sheet 2
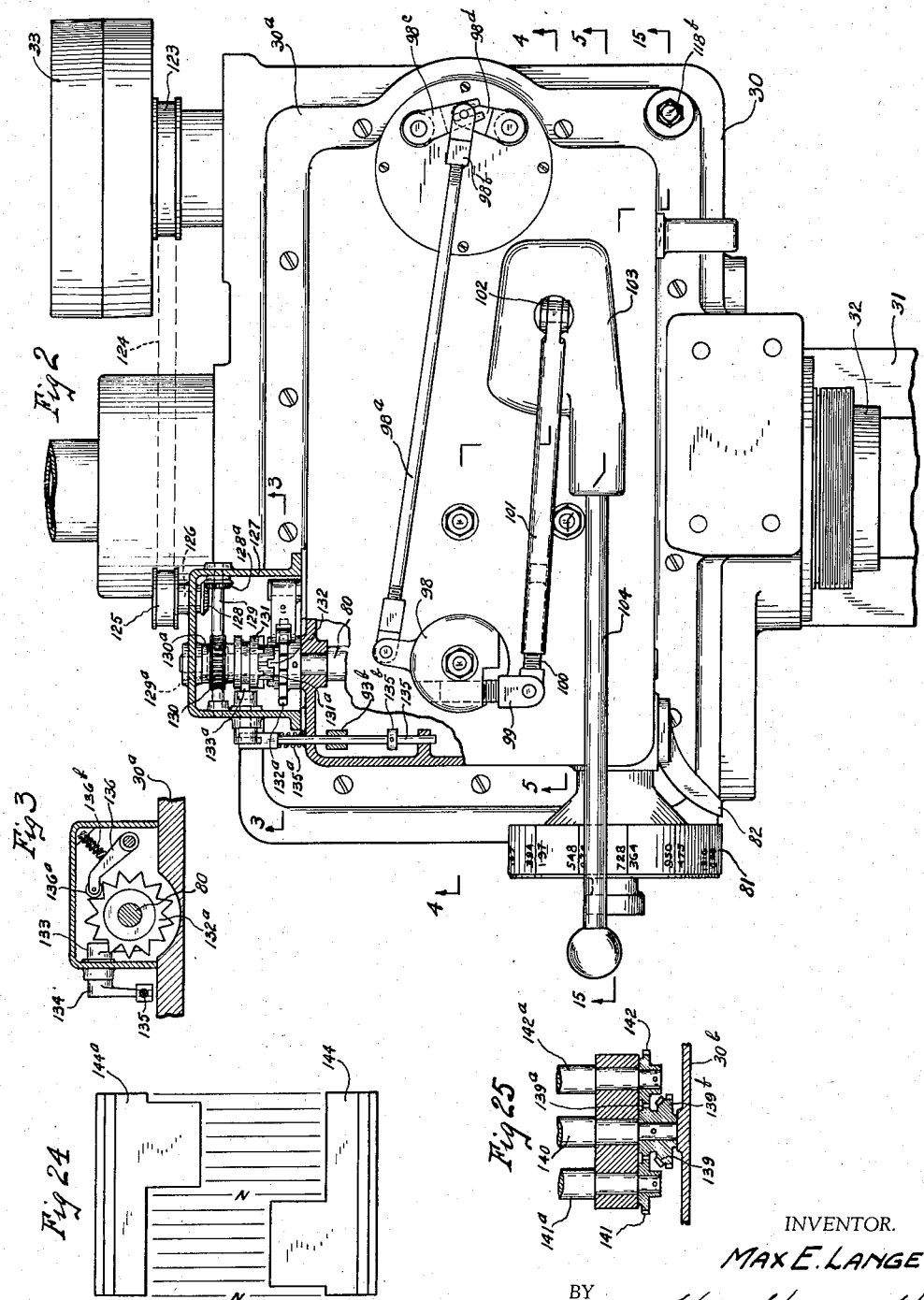
INVENTOR.
MAX E. LANGE
BY
Kris Hudson e Kent
ATTORNEYS

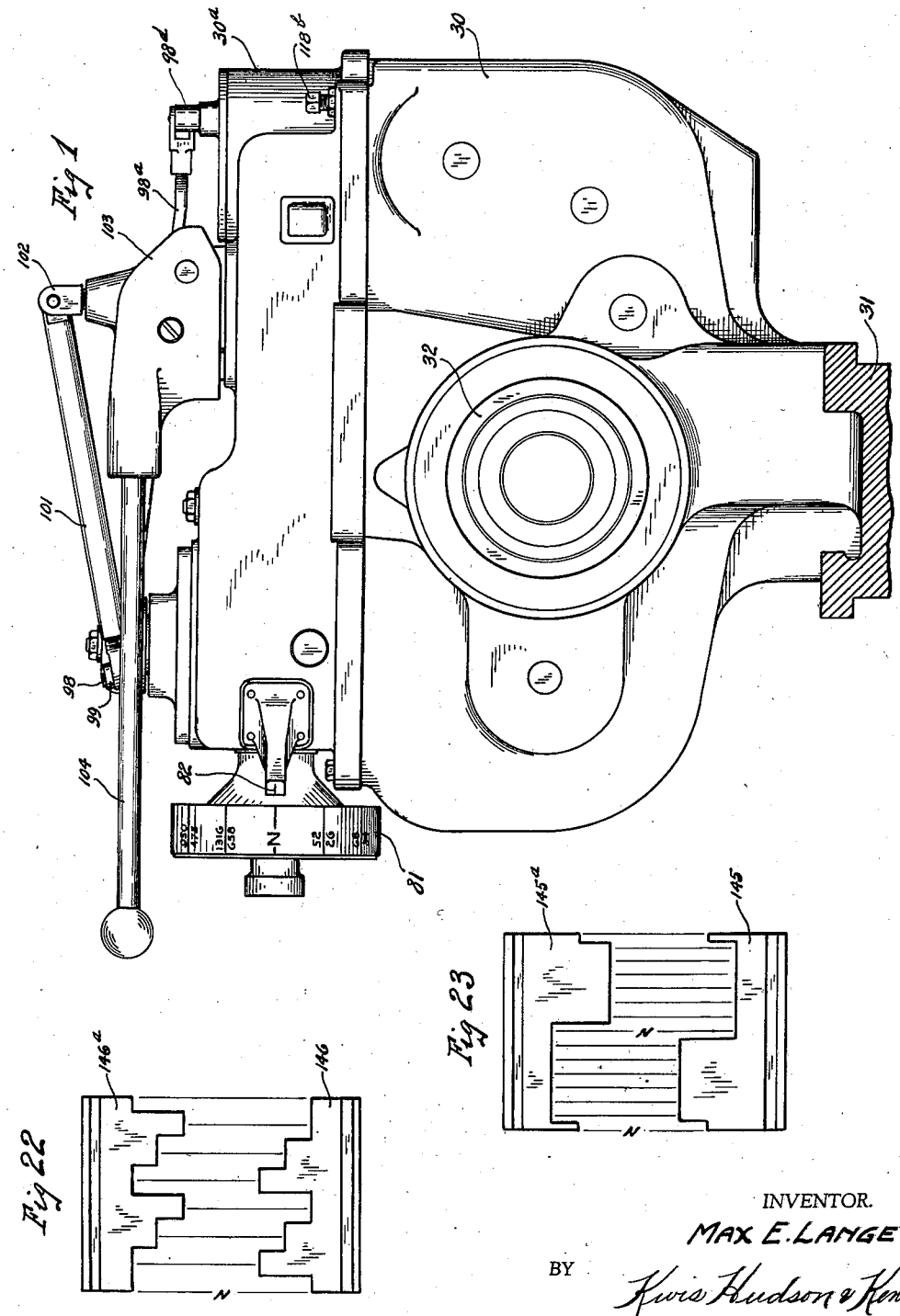

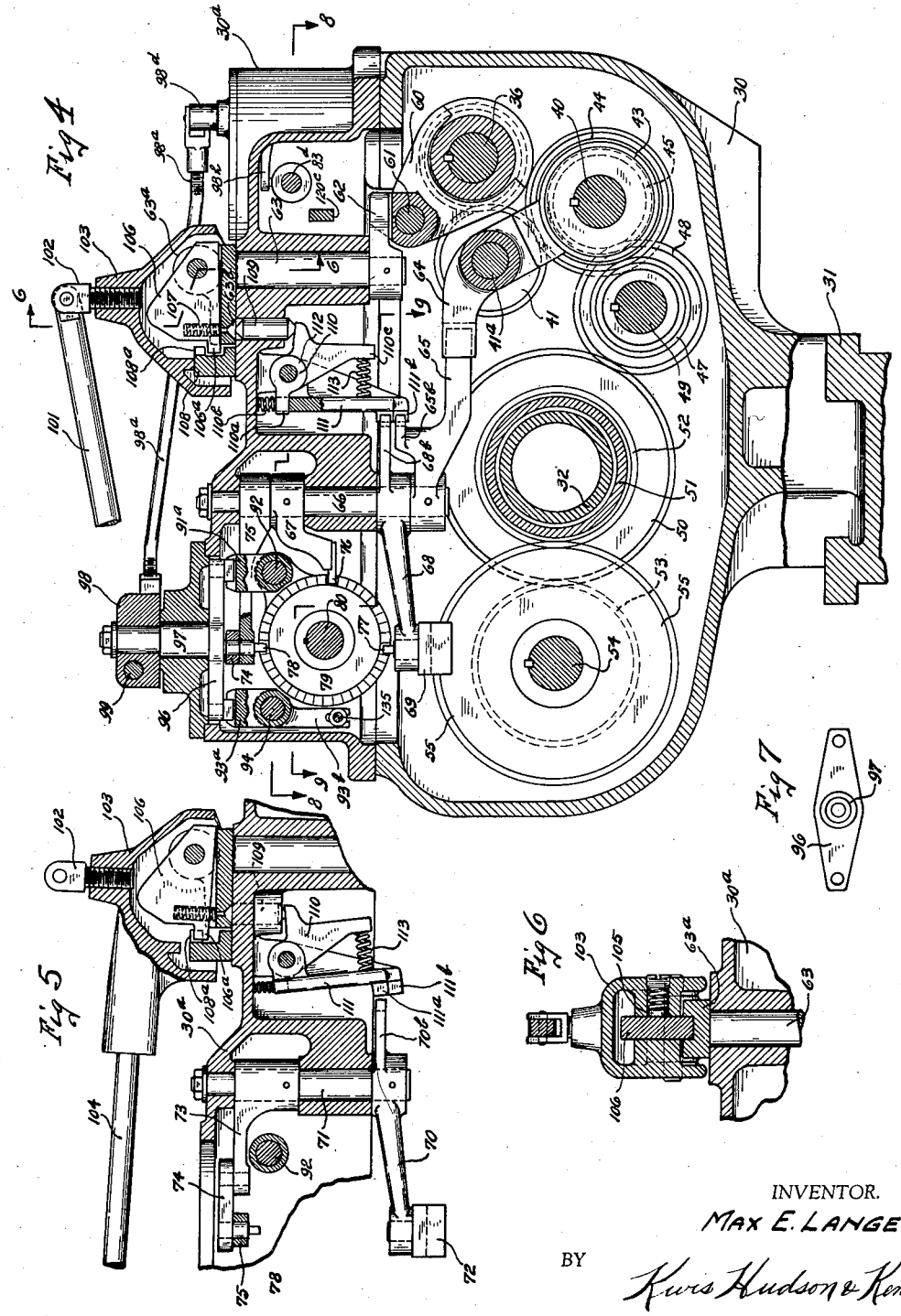

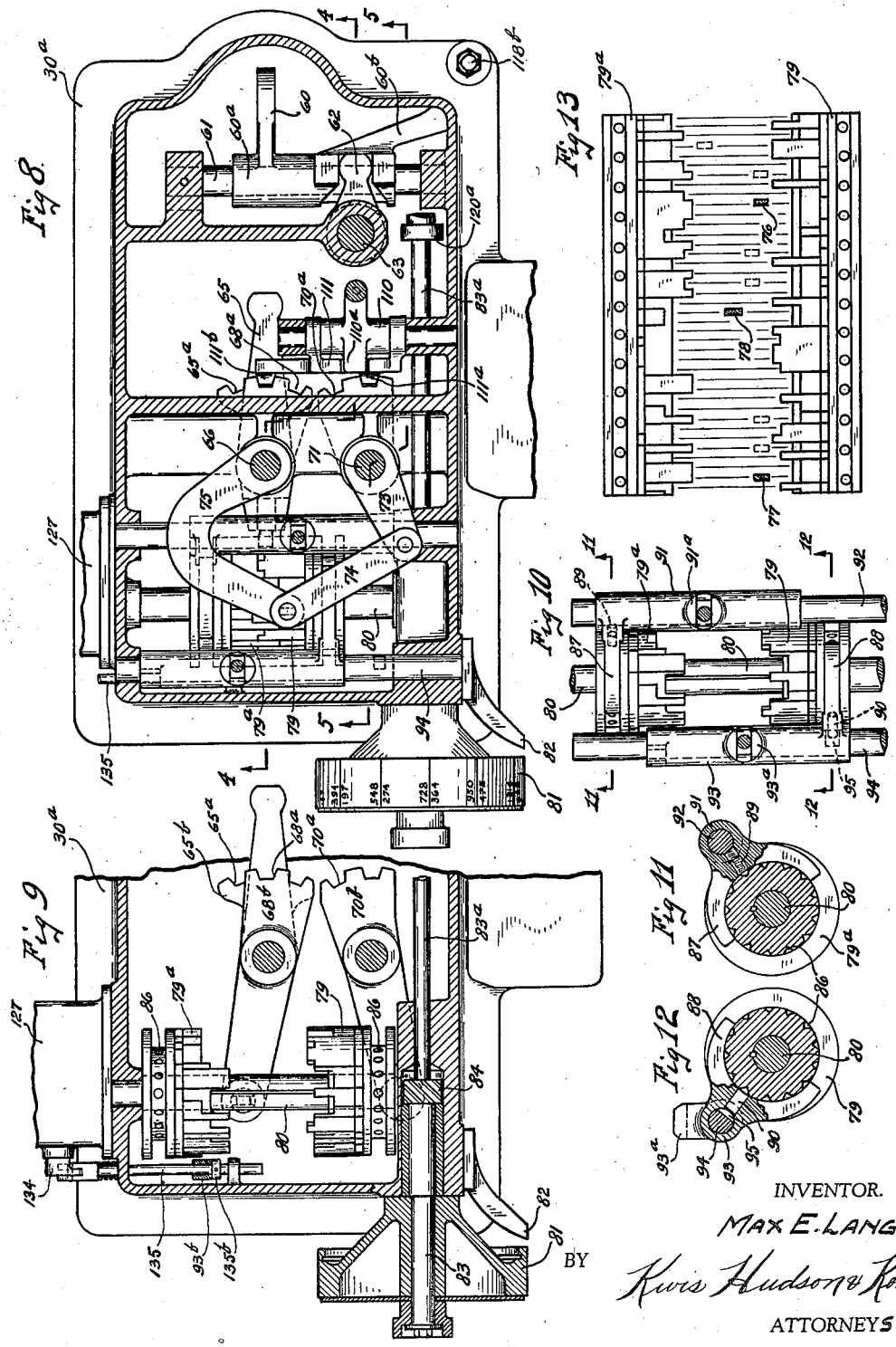

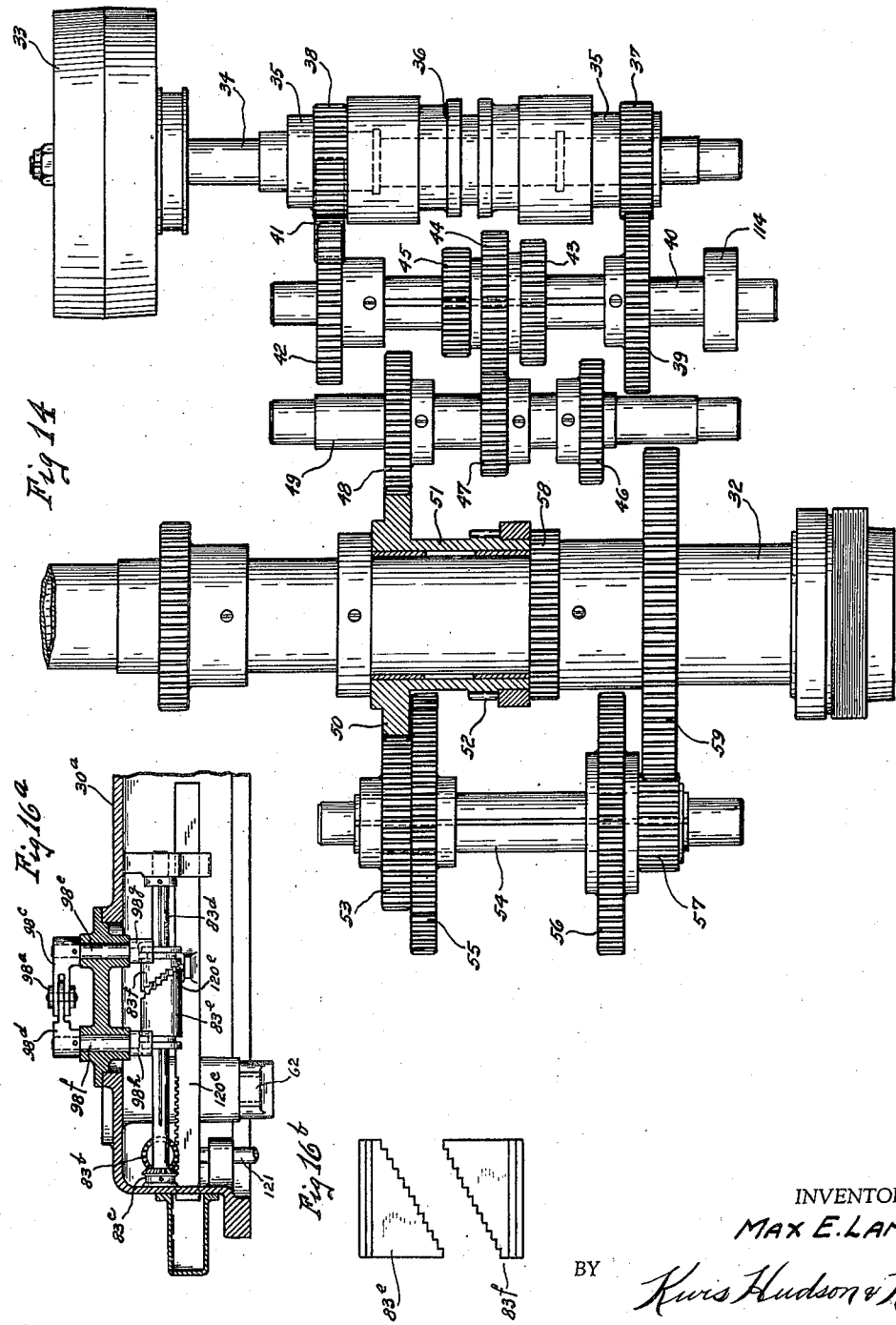

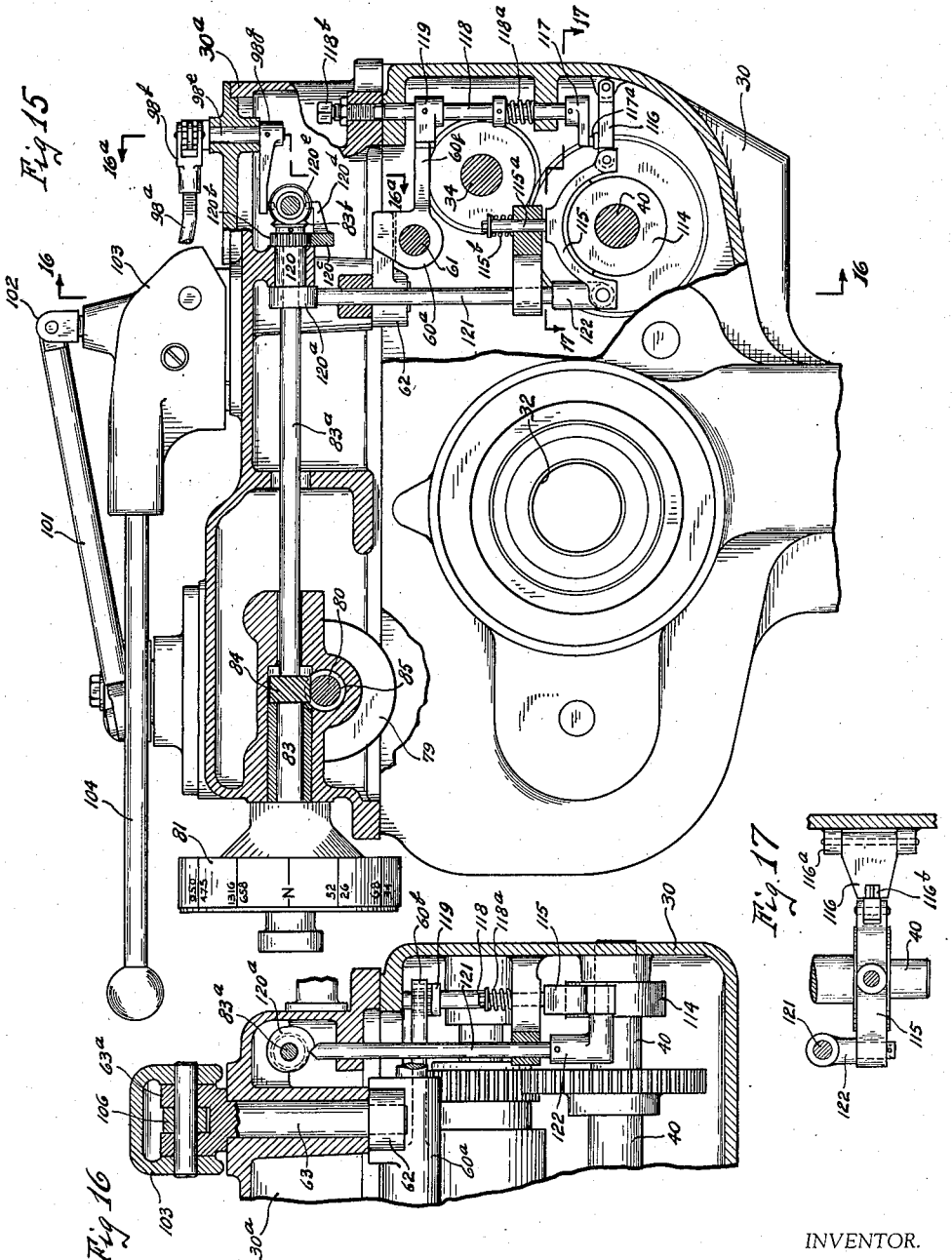

Jan. 19, 1937.  M. E. LANGE  2,068,552
MACHINE TOOL
Filed Feb. 26, 1935   8 Sheets-Sheet 7
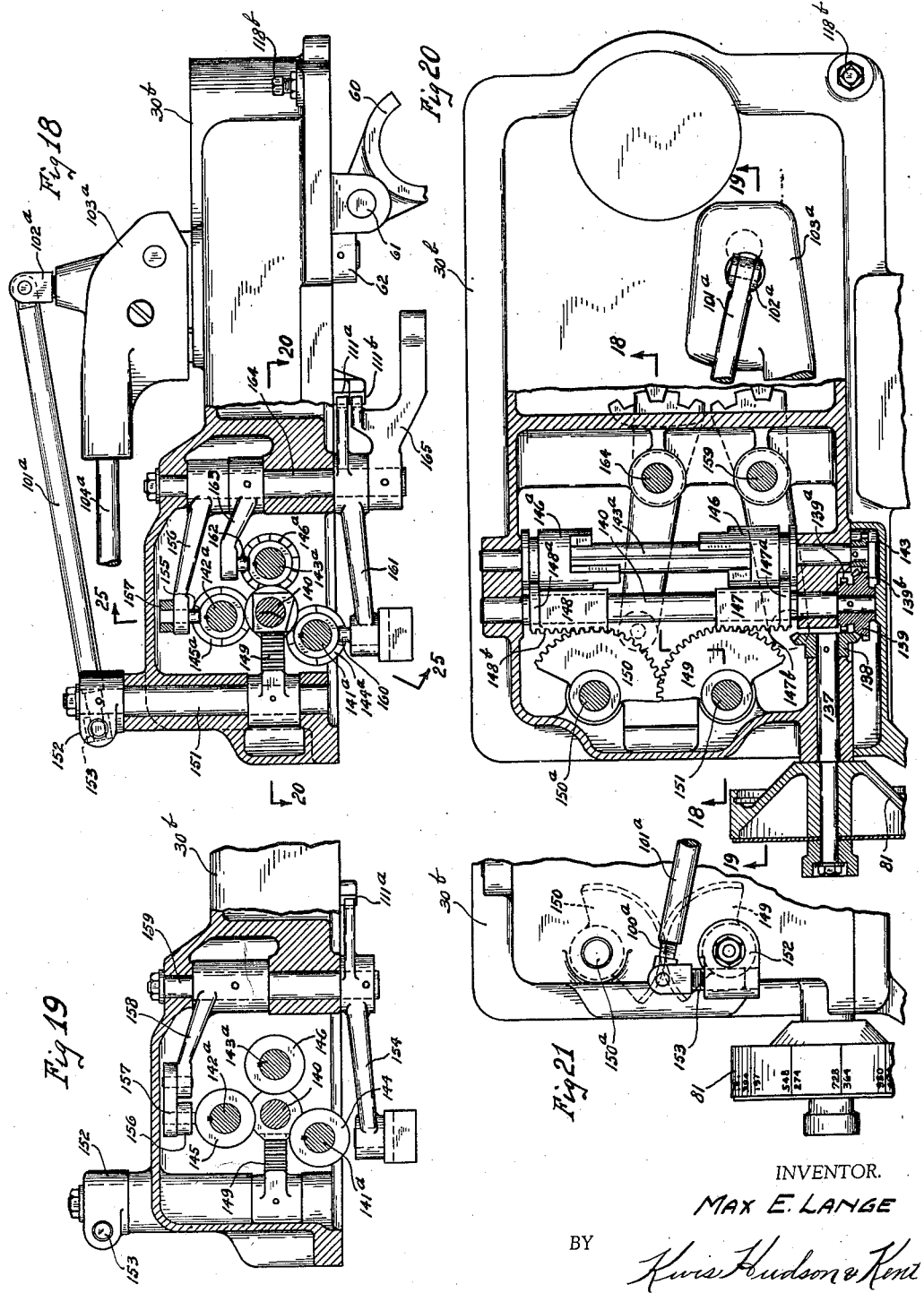
INVENTOR.
MAX E. LANGE
BY
Kwis Hudson & Kent
ATTORNEYS

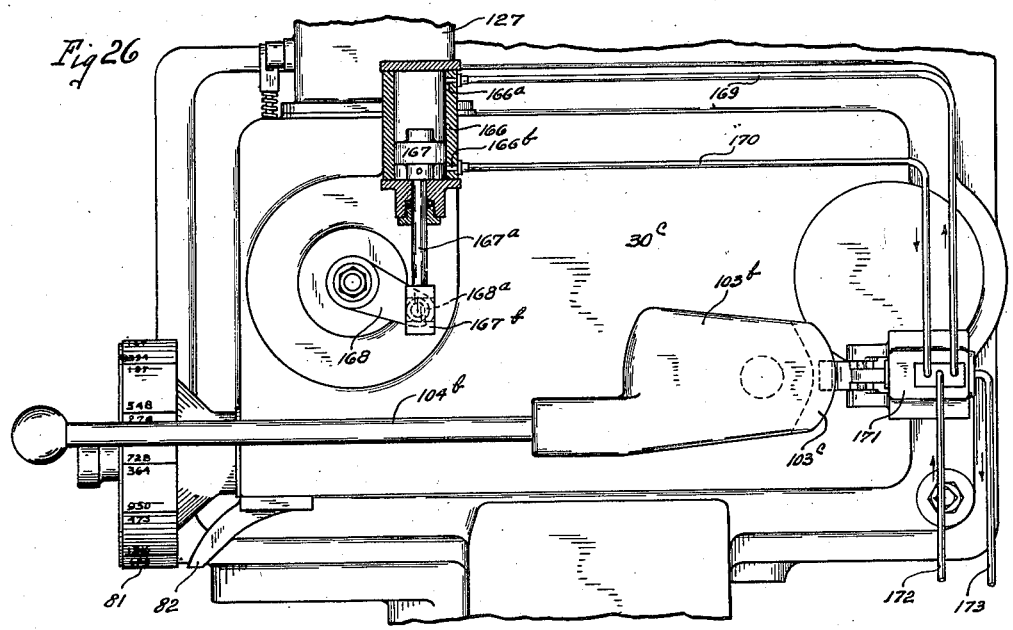
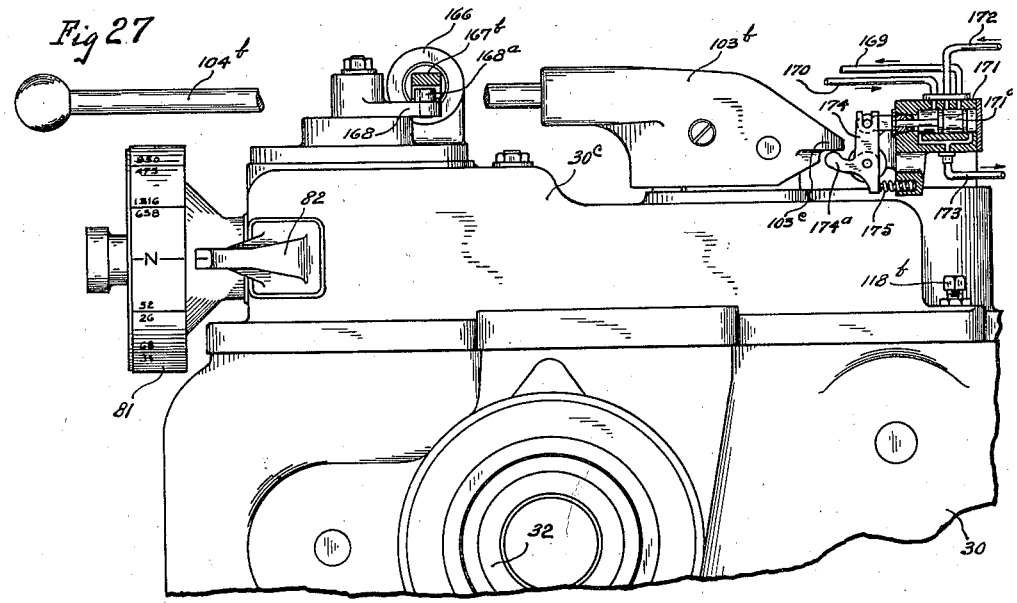

Patented Jan. 19, 1937

2,068,552

UNITED STATES PATENT OFFICE 2,068,552

MACHINE TOOL

Max E. Lange, Cleveland Heights, Ohio, assignor to The Warner & Swasey Company, Cleveland, Ohio, a corporation of Ohio Application February 26, 1935, Serial No. 8,319

49 Claims. (Cl. 82—29)

This invention relates to a machine tool and particularly to means for controlling the operation of a movable part of a machine tool, as, for example, controlling the speeds of operation and the starting, stopping, and reversing of said movable part.

An object of the invention is to provide an improved means for controlling the operation of a movable part of a machine tool.

Another object is to provide improved means for controlling the operation of the spindle of a machine tool.

Another object is to provide improved means for controlling the speeds of operation and the starting, stopping, and reversing of a movable part of a machine tool.

Another object is to provide in a machine tool improved means for controlling the speeds of operation and the starting, stopping, and reversing of the spindle thereof.

Another object is to provide, in a machine tool having a part movable at different speeds and a braking mechanism for stopping the drive of said part, means whereby the braking resistance of said mechanism may be preselected during one speed of movement of said part for the next speed of movement thereof.

Another object is to provide in a machine tool having a part movable at different speeds and having a braking mechanism for stopping the drive of said part, a single control member for applying and releasing said braking mechanism, for preselecting during one speed of movement of said part a different braking resistance for said braking mechanism for the next speed of movement of the part, and for effecting the change to said preselected braking resistance.

Another object is to provide in a machine tool improved means for controlling the speeds of operation of a movable part of the machine and the braking thereof when the movement of the part is to be stopped.

A further object is to provide in a machine tool improved means for controlling the speeds of operation and the starting, stopping, and reversing of a movable part of the machine and the braking of said part when its movement is to be stopped.

A further object is to provide in a machine tool means for controlling the speeds of operation and the starting, stopping, and reversing of a movable part of the machine and including a single control member for said means.

Another object is to provide in a machine tool improved means for controlling the speeds of operation and the starting, stopping, and reversing of a movable part of the machine and for imposing upon said part, when its movement is to be stopped, a variable braking resistance proportional to its speed of movement.

Another object is to provide in a machine tool a single control member for controlling and actuating a preselecting speed change gear device and the stop, start, and reverse clutch of the drive for a movable part of the machine tool.

Another object is to provide in a machine tool a single control member for controlling and actuating a preselecting speed change gear device and the stop, start, and reverse clutch of the drive for a movable part of the tool and for imposing upon said part, when its movement is to be stopped, a variable braking resistance proportional to its speed of movement.

Another object is to provide in a machine tool preselecting means for the speed change gears of the drive of a movable part of the machine tool and wherein said preselecting means controls the imposition upon said part, when its movement is to be stopped, of a variable braking resistance proportionate to the speeds of movement of the part.

A further object is to provide in a machine tool a single control member for controlling and actuating a preselecting speed change gear device and the start, stop, and reverse clutch of the spindle drive.

Another object is to provide in a machine tool a single control member for controlling and actuating a preselecting speed change gear device and the stop, start, and reverse clutch of the spindle drive and wherein the preselecting device controls the imposition upon the spindle drive when it is to be stopped of a variable braking resistance directly proportional to the speed of operation of the spindle.

Another object is to provide in a machine tool preselecting and gear shifting means for the drive of a movable part thereof and including power actuated gear shifting members.

Further and additional objects and advantages not hereinbefore set forth will become apparent hereinafter during the detailed description which is to follow of several embodiments of the invention.

In order to illustrate the invention and several mechanical embodiments thereof, the invention has been shown herein as applied to the head stock of a lathe and as controlling the operation of the spindle thereof, but it should be understood that the invention may be applied to other movable parts of a machine tool having a speed change drive and forward and reverse directions of movement.

Referring to the accompanying drawings:

Fig. 1 is an elevational view of the head stock of a lathe and is taken in a direction looking toward the spindle nose;

Fig. 2 is a top plan view of the head stock shown in Fig. 1 with certain portions at the upper left-hand corner of the head stock broken away and shown in section;

Fig. 3 is a detail sectional view taken substantially on line 3—3 of Fig. 2, looking in the direction of the arrows;

Fig. 4 is an irregular vertical sectional view through the head stock and is taken substantially on lines 4—4 of Figs. 2 and 8, looking in the direction of the arrows;

Fig. 5 is a fragmentary vertical sectional view taken substantially on lines 5—5 of Figs. 2 and 8, looking in the direction of the arrows;

Fig. 6 is an irregular detail vertical sectional view taken substantially on line 6—6 of Fig. 4, looking in the direction of the arrows;

Fig. 7 is a detached detail view of a part of the mechanism shown in Fig. 4;

Fig. 8 is a horizontal sectional view taken substantially on line 8—8 of Fig. 4, looking in the direction of the arrows;

Fig. 9 is a fragmentary irregular horizontal sectional view taken substantially on line 9—9 of Fig. 4, looking in the direction of the arrows;

Fig. 10 is a detached view of a portion of the parts illustrated at the left-hand end of Fig. 8, said parts however being in a different position in Fig. 10 than in Fig. 8;

Fig. 11 is a detail sectional view taken substantially on line 11—11 of Fig. 10, looking in the direction of the arrows;

Fig. 12 is a detail sectional view taken substantially on line 12—12 of Fig. 10, looking in the direction of the arrows;

Fig. 13 is a developed view of the spools shown in Figs. 8, 9, and 10, and illustrates diagrammatically various positions of the gear shift levers which are located between the spools;

Fig. 14 is a diagrammatic illustration of the speed change gearing and drive for the spindle in the head;

Fig. 15 is a view, partly in elevation and partly in section, of the head stock of a lathe and is taken substantially on line 15—15 of Fig. 2, looking in the direction of the arrows, and illustrates the brake mechanism for the spindle drive;

Fig. 16 is a fragmentary sectional view taken substantially on line 16—16 of Fig. 15, looking in the direction of the arrows;

Fig. 16a is a detached detail sectional view taken substantially on line 16a—16a of Fig. 15;

Fig. 16b is a developed view of the spools for operating the presetting means for the brake mechanism;

Fig. 17 is a fragmentary sectional view taken substantially on line 17—17 of Fig. 15, looking in the direction of the arrows;

Fig. 18 illustrates a modified form of construction from that previously illustrated and is a fragmentary view of a head stock of a lathe partly in elevation and partly in section, the section being taken substantially on line 18—18 of Fig. 20, looking in the direction of the arrows;

Fig. 19 is a fragmentary sectional view of the head stock and is taken substantially on line 19—19 of Fig. 20, looking in the direction of the arrows;

Fig. 20 is a fragmentary top plan view of the head stock partially in section, the section being taken on line 20—20 of Fig. 18, looking in the direction of the arrows;

Fig. 21 is a fragmentary top plan view of the head stock and shows the parts which are above the sectional portion of Fig. 20;

Fig. 22 is a developed view of the spools for operating the gear shifting mechanism for the three-step gear cone of the drive in the head as shown in Fig. 14;

Fig. 23 is a developed view of the spools for operating the shifting members for the front two-step gear cone as shown in Fig. 14;

Fig. 24 is a developed view of the spools for operating the shifting members for the rear two step gear cone shown in Fig. 14;

Fig. 25 is a fragmentary irregular sectional view taken substantially on line 25—25 of Fig. 18, looking in the direction of the arrows;

Fig. 26 illustrates a modified form of construction from those previously illustrated and is a fragmentary top plan view of a head stock of lathe partly in section; and Fig. 27 is an end elevational view of the head stock shown in Fig. 26 taken looking toward the nose of the spindle and is partly in section.

Referring to Fig. 1, there is shown a head stock 30 of a lathe and a cover 30a therefor, a portion of the bed 31 thereof, and the nose of a rotatable work spindle 32 which is mounted in the head.

As will be understood in the art, the rotatable work spindle 32 is driven at different speeds by means of change speed gearing arranged in the head and its rotation is stopped, started, and reversed by means of clutches likewise located in the head 30.

Reference should first be made to Fig. 14 of the drawings wherein a train of change speed gearing for driving the spindle 32 is shown, as are also the clutches for starting, stopping, and reversing the rotation of the spindle.

A pulley 33 is fixed to a shaft 34 rotatably mounted in the head and said pulley is preferably driven by a belt drive from a two-speed motor (not shown) so that the work spindle will have a series of high speed operations and a series of low speed operations, depending upon the speed of operation of the motor. It will be understood that a conveniently located and operated control switch for the motor is provided on the head.

A pair of multiple disc clutches 35 are mounted on the shaft 34 and a clutch operating member 36 is splined to the shaft between the clutches 35 to be moved into clutching engagement with either one of said clutches to obtain forward or reverse drives for the spindle or to be positioned in neutral out of clutching engagement with both clutches to stop the rotation of the spindle. It will be understood that the parts of the clutches 35 carrying the gears 37 and 38 are freely rotatable on the shaft 34 until the parts by which they are carried are clutched to the member 36.

The gear 37 constantly meshes with a gear 39 fixed to a shaft 40 arranged in the head in parallel relationship to the shaft 34. The gear 38 meshes with an idler gear 41 rotatable on shaft 41a (see Fig. 4) which in turn meshes with a gear 42 likewise fixed to the shaft 40. Intermediate the gears 39 and 42 a three-step gear cone is splined to the shaft 40 so as to rotate therewith and slide thereon and comprises the gears 43, 44, and 45.

When the three-step gear cone is properly shifted, the gear 43 will be brought into mesh with a gear 46 or the gear 44 with a gear 47 (as shown in Fig. 14), or the gear 45 with a gear 48, the gears 46, 47, and 48 being fixed to a shaft 49 rotatably mounted in the head and capable of having imparted thereto three different speeds of rotation in both a forward and a reverse direction.

The gear 48 constantly meshes with a gear 50 carried by a sleeve 51 freely rotatable on the spindle 32 but held against axial movement thereon. The sleeve 51 is provided with a second gear 52 spaced axially of the spindle from the gear 50. The gear 50 on the sleeve 51 may be meshed with a gear 53 of a two-step gear cone splined to a shaft 54 so as to rotate therewith but slide thereon, or the gear 52 on the sleeve 51 may mesh with the gear 55 of the said two-step gear cone when said cone has been shifted from the position shown in Fig. 14 to a position such as to bring the gears 52 and 55 into intermeshing relationship. It will be understood that the shaft 54 can be rotated through the two-step gear cone and the three-step gear cone at six different speeds in both the forward and reverse directions.

A second two-step gear cone is splined to the shaft 54 and comprises a gear 56 and a gear 57. This last mentioned two-step gear cone may be shifted in one direction to bring the gear 56 into intermeshing relationship with a gear 58 fixed to the spindle 32 or it may be shifted in the opposite direction to bring the gear 57 into intermeshing relationship with a gear 59 also fixed to the spindle 32. It will thus be seen that through the two two-step gear cones and the three-step gear cone the spindle 32 may be driven at twelve different speeds in both the forward and reverse directions. It will be remembered that a two-speed motor preferably is used to drive the shaft 34 through the pulley 33 and thus the spindle 32 may be driven at any one speed in two series of twelve speeds each, or at twenty-four different speeds in both the forward and the reverse directions.

The construction thus far described is conventional and does not form any part of the present invention except so far as it has cooperating relationship with the construction later to be described.

The clutch member 36 is shifted by means of a yoke member 60 integral with a sleeve 60a slidable on a rod 61 fixedly mounted in brackets located within the head 30 and carried by the cover 30a, see Figs. 4 and 8. The yoke member straddles a groove in the clutch member 36 and is actuated endwise of the rod 61 by a short lever 62 having its end between lugs formed on the member 60, and said lever 62 is fixed to the lower end of an oscillatable vertically extending shaft 63 mounted adjacent the top of the head in the cover 30a (see Fig. 4) to which reference will later be made. It will be understood that, if the shaft 63 is rocked in one direction or the other, the clutch member 36 will clutch the member 35 and the gear 38 or the member 35 and the gear 37 to the pulley shaft 34.

The three-step gear cone on the shaft 40 is shifted by means of a yoke member 64 slidably mounted on the shaft 41a which carries the idler gear 41, which yoke member has a portion at one end straddling the middle gear of the three-step gear cone and an angularly disposed portion at its opposite end straddling the end of a lever 65 which has its opposite end fixed to the lower end of an oscillatable, vertically extending shaft 66 carried by the cover 30a. The shaft 66, adjacent its upper end, has fixed thereto a lever 67 later to be referred to. It will be understood that, when the shaft 66 is rocked, the member 64 will be moved endwise of the shaft 41a to shift the three-step gear cone to any of its three operative positions.

The rear two-step gear cone (the upper gear cone shown in Fig. 14) on the shaft 54 is shifted to either of its two operative positions by means of a lever 68 loosely mounted on the shaft 66 above the lever 65 and having at its end a shoe 69 straddling the gear 55.

The other or front two-step gear cone on the shaft 54, that is, the lower two-step gear cone as viewed in Fig. 14, is shifted to either of its two operative positions by means of a lever 70 fixed to a vertically extending rockable shaft 71 carried by the cover 30a of the head (see Fig. 5), which lever is provided at its end with a shoe 72 that straddles the gear 56 of the two-step gear cone.

The shaft 71 adjacent its upper end has secured thereto a short lever 73 the outer end of which is pivotally connected to one end of a link 74. The opposite end of the link 74 is pivotally connected to the upper side and at one end of an angularly bent arm 75, the opposite end of which arm is pivotally mounted on the shaft 66 above the short lever arm 67 previously referred to, see Figs. 4 and 8. It will be seen that when the arm 75 is moved in opposite directions the shaft 71 will be rocked through the link 74 and the lever arm 73 and hence movement of the arm 75 will effect a shifting movement of the front two-step gear cone on the shaft 54 to one or the other of its two operative positions.

The levers 67 and 68 and the arm 75 are provided with pins 76, 77, and 78, respectively, shown in the drawings as being substantially rectangular in cross-section, which pins are equally spaced radially from a common center and are circularly spaced in predetermined relationship as shown in Fig. 4. The pins 76, 77, and 78 lie intermediate a pair of spools 79 and 79a mounted on a shaft 80 so as to slide therealong and rotate therewith, said shaft 80 being the common center from which the pins are radially equally spaced.

In Fig. 8 the spools are shown in their most inward position upon the shaft 80, while in Figs. 9 and 10 the spools are illustrated in their most outward or separated position on the shaft 80. The spools 79 and 79a can be moved along the shaft 80 toward each other an equal distance from their outer positions, as shown in Figs. 9 and 10, by means later to be more fully explained, the movement of the spools toward each other acting to shift the pins 76, 77, and 78 to effect a shifting of the levers and the arm carrying said pins and in turn a shifting of the various gear cones previously referred to.

The spools 79 and 79a are formed on their adjacent surfaces with predetermined series of projections of varying length adapted to contact with the pins 76, 77, and 78 to shift one or more thereof after various positions of rotative adjustment have been given to the spools and the latter have been moved toward each other. When a long projection on one spool is opposite a shorter projection on the other spool and the spools are moved inwardly an equal distance, it will be understood that if one of the pins is engaged by the long projection the pin will be shifted during the inward movement of the spools toward the spool that has the short projection. In the instance where projections of equal length are brought into engagement with the pin when the spools are moved toward each other an equal distance, it will be clearly seen that the pin will be positioned by the projections in a central location with respect to the spools. Thus a plurality of different arrangements of the projections on the spools may be effected by giving the spools a step-by-step rotative movement when the spools are in their outermost position so that a movement of the spools an equal distance inwardly toward each other will result in predetermined movements to or positioning of the pins 76, 77, and 78, and, therefore, a predetermined shifting of the gear cones in the head and a consequent changing of the speed of operation of the work spindle.

It is necessary, in order to shift the pin that actuates the three-step gear cone to three operative positions, that the spools be provided with cooperating long and short projections, projections of equal length, and short and long projections, respectively, so that the pin will be moved to one side or the other of a central position relative to the spools or may be moved into said central position. Inasmuch as the rear two-step gear cone need only be moved into two operative positions, the spools should be provided with cooperating sets of long and short projections and cooperating sets of short and long projections for shifting the pin associated with said two-step gear cone, it being understood that the pin need only be moved to one or the other of two working positions. It is necessary to move the front two-step gear cone to a neutral position to disconnect the work spindle from its gear drive to permit the spindle to rotate freely for purposes of loading. Therefore, in one position of the step-by-step rotative adjustment of the spools, the same should be provided with a pair of projections of equal length which engage the pin associated with the front two-step gear cone to bring it into neutral position, otherwise the spools are provided with cooperating sets of long and short projections and short and long projections for shifting the said pin to either one or the other of its two working positions, similar to the provision made for the shifting of the pin associated with the rear two-step gear cone, as previously explained.

Inasmuch as there has been illustrated a work spindle having twelve different speeds of operation in the forward and reverse directions, it will be necessary to impart to the spools thirteen equal step-by-step increments of rotation to complete one revolution of the spools, twelve of such steps of rotation setting the spools for the twelve different speeds of the work spindle, while the thirteenth step of rotation of the spools sets the latter to effect the shifting of the front two-step gear cone into neutral position.

Inasmuch as the spools are given thirteen successive steps of rotative adjustment in a single complete rotation and there are three pins to be shifted by the spools, each spool is provided with three series of thirteen projections each, one series being for each of the pins, and the total number of projections on the spools thus being thirty-nine. The projections of the series are so arranged that, as the spools are moved from one step to another, the series of projections for one pin will not operate either of the other pins. This arrangement is accomplished by having the projections of the three series arranged in groups of three, wherefore, during the step-by-step rotation of the spools, the projections of the series will always be in the same relationship with each other.

The spools 79 and 79a can be manually indexed step-by-step, as will now be explained, or they can be indexed by power, as will later be explained.

Assuming that the work spindle 32 has just been loaded with a new work piece and the machine is at rest, and the front two-step gear cone is in neutral position, the dial 81 on the front of the cover 30a of the head will be in such position that the letter "N" on its circumference will coincide with a pointer line on the pointer 82 and indicates that the work spindle is not connected to the gear drive, and the front two-step gear cone is in neutral position.

The dial 81 is carried by a shaft 83 rotatably mounted in the cover and provided with a spiral gear 84 meshing with a spiral gear 85 on the shaft 80 (see Figs. 9 and 15), wherefore rotation of the dial 81 and the shaft 83 causes a rotation of the shaft 80 and a rotation of the spools 79 and 79a carried thereby. A complete rotation of the dial 81 from the position shown in Fig. 1 will effect a complete rotation of the spools 79 and 79a, while a step-by-step rotation of the dial to bring the different numerals on its circumference in line with the pointer 82 will effect a similar step-by-step rotation of the spools, such numerals indicating the different spindle speeds and being arranged in pairs to indicate the different speeds in each of the two series obtained when the motor is operated at its high or low speed.

Assuming that the front two-step gear cone is in neutral position and the rear two-step gear cone is in its most forward position, while the three-step gear cone is in its most rearward position, as viewed in Fig. 14, then the pins 76, 77, and 78 will occupy the positions shown in full lines in Fig. 13. The dial 81 is now turned to move the spools one step of rotation, and when afterwards the spools are moved inwardly to shift the pins, the pin 78, in the present instance, will be shifted to shift the front two-step gear cone forwardly into mesh with the gear 59 carried by the spindle, while the pins 77 and 76 will remain in the positions they were previously in. Assuming that the dial and the spools are turned another step for the next speed, the pins 77 and 78 will not be shifted when the spools are moved inwardly, while the pin 76 will be moved in a manner to effect a shifting of the three-step gear cone from its most rearward position to its most forward position, that is, the gears 45 and 48 will be disengaged and the gears 43 and 46 brought into mesh. It will be clear that any successive movement of the dial will effect a step-by-step movement of the spools and thus the pins will be shifted in predetermined ways as the spools are brought inwardly to effect a shifting of the various gear cones to provide the different speeds of operation for the work spindle. In practice, it will be understood that the dial is rotated to the desired speed of operation which in many instances will impart rotative movement to the spools through a number of their rotative steps of adjustment.

The spools 79 and 79a are provided with annular grooves in the bases of which are formed thirteen depressions 86 corresponding to the number of steps of rotation that the spools are given in a complete movement of rotation. Forks 87 and 88 extend into the grooves with the fork 87 carrying a spring point 89 engaging the depression 86 of the spool 79a and with the fork 88 carrying a locking pin 90 engaging the depression 86 of the spool 79, as will be explained hereinafter.

The fork 87 is integral with a sleeve 91 slidably mounted on a rod 92 arranged horizontally in the cover 30a of the head while the fork 88 is integral with a similar sleeve 93 slidably mounted on a rod 94 spaced from but parallel to the rod 92.

When the spools 79 and 79a are in their most outward position, as indicated in Figs. 9 and 10, the locking pin 90 of the fork 88 registers with a recess 95 formed in the rod 94 to allow the pin 90 to move radially outwardly from a depression 86 into the recess 95 and permit the spools to be given their step-by-step indexing movement by rotating the dial 81 with the spring point 89 locating the dial for each step of movement. It will be seen that the lock pin 90 forms a safety device so that the spools may be rotated only in their most outward positions where the projections on the spools will not contact with the pins 76, 77, and 78.

The sleeves 91 and 93 are provided with upwardly extending portions 91a and 93a having transversely extending slots in which slidably engage shoes carried at the opposite ends of an equalizer bar 96 formed integral with the lower end of a vertically extending shaft 97 mounted for rocking movements in the cover 30a of the head and projecting outwardly therefrom, see Figs. 4 and 10.

It will be apparent that when the shaft 97 is rocked in one direction or the other the spools 79 and 79a will be moved inwardly and outwardly an equal distance, since the arms of the equalizing bar 96 are of equal length.

The shaft 97, as previously explained, extends above the upper side of the cover of the head, and there is secured to said extending portion of the shaft to rock therewith a disc 98 having a threaded opening receiving the threaded end of a rod 99 constituting a lever, it being noted that the rod 99 can be adjusted relative to the disc 98 to provide for varying leverages.

The outer end of the rod 99 is pivotally connected to the threaded portion 100 of a two-part link, the other portion 101 of which is adapted to be adjustably screwed upon the portion 100 for varying the length of the link. The opposite end of the portion 101 is pivotally connected to a fork 102 having a threaded extension which screws into a vertically extending threaded opening in the upper side of a hub member 103, the fit between the threaded extension and the opening being such that the extension will turn freely in the opening when the hub is turned and will allow an adjustment of the fork 102 for varying leverages.

The hub 103 straddles and is pivotally connected to a substantially U-shaped portion 63a formed on the previously mentioned shaft 63 and located above the upper side of the cover 30a of the head, as clearly shown in Figs. 4, 5, and 6, thus allowing the hub 103 to rock about a horizontal axis.

The hub 103 is provided with a forward extension into which is secured the end of an operating member or lever 104 that projects above the cover 30a of the head and beyond the front side thereof within easy reach of the operator. It will be seen that by means of the lever 104 the hub 103 can be rocked about its pivotal connection to the portion 63a of the shaft 63 in a vertical direction. The movement of the lever 104 and the hub 103 in a vertical direction acts through the link 100—101 and lever 99 to rock the disc 98 and shaft 97 to cause the equalizer bar 96 to effect an equal movement of the spools inwardly and outwardly, the upward movement of the lever 104 moving the spools outwardly to allow them to be indexed and the downward movement of the lever 104 moving the spools inwardly to shift one or more of the pins 76, 77, and 78 and consequently the gear cones in the head.

When the lever 104 is moved upwardly from a substantially horizontal position, as viewed in Fig. 5, to cause the spools to move outwardly and to allow the dial 81 and the spools to be turned to select a different speed for the work spindle, the lever 104 will be retained in its upper position by means of a friction shoe 105 engaging the side of a block 106 located within the hub and pivotally mounted in the U-shaped portion 63a upon the same pivot as the hub. Downward movement of the lever 104 will bring the spools inwardly to shift the pins and the gear cones to change the speed of the work spindle and will also rock the hub 103 about its pivot and through the frictional engagement of the shoe 105 with the side of the block 106 will rock the latter downwardly to the position shown in Fig. 4.

The movement of the block 106 downwardly compresses a spring 107 arranged in a recess in the block and engaging with the U-shaped portion 63a of the shaft 63 while the block abuts the portion 63a adjacent the lefthand end of the block as viewed in the drawings. The block 106 at its left-hand end, as viewed in Fig. 4, is provided with a tongue 106a which, when the block abuts the portion 63a, extends into a segmental groove formed in the inner side of a stationary block 108 located within the hub 103 and secured to the cover 30a, wherefore the control lever 104 may be moved horizontally in opposite directions to rock the shaft 63 and to engage the friction clutches 35 with the clutch member 36 for forward or reverse operation of the work spindle. When the control lever 104 is in the position it occupies when both of the friction clutches, previously referred to, are disengaged from the member 36, a notch 108a in the stationary block 108 is in alignment with the tongue 106a of the block 106 so that the spring 107 can move the block and hub upwardly when the lever is released by the operator to bring the tongue 106a within the notch 108a and thus hold the control lever 104 from horizontal movements and in neutral position with both clutches disengaged. It will be seen that when the control lever has been moved to a neutral position and the operation of the spindle stopped the operator need merely take his hand from the control lever and it will move automatically into the locked position just explained.

In order that the gear cones may not be shifted until the control lever has been brought to a neutral position, i. e., both friction clutches disengaged, the mechanism now to be described is employed.

The under side of the U-shaped portion 63a of the shaft 63 is provided with a depression 63b which, when the control lever is in the neutral position, registers with a locking pin 109 mounted in an opening formed in the top of the cover of the head and engaging at its lower end an extension formed on the lever 110 of a two-part locking member, the other part of which is a lever 111. It will be seen that the lever 111 of the two-part locking member is provided with ears pivoted upon a pin 112 while the lever 110 is pivoted upon the same pin 112 between the ears of the lever 111. The lever 110 has an extension 110a engaged by a spring 110b and normally held in contact with the upper end of the lever 111 by means of a spring 113. The lever 110 has a downwardly projecting extension 110c between which extension and the lever 111 is located said spring 113. The lower end of the lever 111 is provided adjacent the spring 113 with a laterally extending locking tooth 111a. The lever 111 also has at its lower end a rearwardly projecting extension carrying at its end a laterally extending locking tooth 111b.

The locking tooth 111a, when the lever 111 is in the position shown in Figs. 4 and 8, is adapted to engage in one or the other of two recesses 70a formed in the arcuate edge of an extension 70b of the lever 70 to lock the lever 70 (see Fig. 5) in one or the other of the two positions it assumes after shifting the front two-step gear cone to either of its operative positions.

The locking tooth 111b is somewhat longer than the locking tooth 111a, as shown in Fig. 5, and when the lever 111 is in the position shown in Fig. 4, the locking tooth 111b is adapted to engage in one or the other of two recesses 68a formed in the arcuate edge of an extension 68b of the lever 68 to lock said lever in one or the other position to which it has been moved in shifting the rear two-step gear cone into either of its operative positions.

The locking tooth 111b, when the lever 111 is in the position last mentioned, is also adapted to engage in one or the other of three recesses 65a formed in the arcuate edge of an extended portion 65b on the upper side of the lever 65 to lock the lever 65 in one or another of the three positions it assumes in shifting the three-step gear cone to its three operative positions.

When the control lever 104 is in the neutral position, the recess 63b on the under side of the U-shaped portion 63a of the shaft 63 registers with the locking pin 109, whereupon the spring 110b rocks the lever 110 and the lever 111 as a unit in a counter-clockwise direction from the position shown in Fig. 4 to the position shown in Fig. 5 at which latter time the locking pin 109 is in its elevated position and the locking teeth 111a and 111b are moved out of locking engagement with respect to the levers 65, 68, and 70, thus allowing said levers to move freely to shift the respective gear cones. After the gear cones have been shifted during the downward movement of the control lever 104 and the lever 104 moved horizontally to a position to cause rotation of the spindle 32 in forward or reverse directions, the recess 63b is out of registry with the locking pin 109, and the latter moves from the position shown in Fig. 5 to that shown in Fig. 4 to move the two-part locking member 110 and 111 as a unit in a clockwise direction to lock the levers 65, 68, and 70 against movement.

The levers 110 and 111 normally move as a unit to function as has just been described, but under certain abnormal conditions it is desirable that the levers have relative movement to each other and the spring 113 is provided to cushion said relative movement and to restore the levers 110 and 111 to their normal position, as will later be explained.

It is desirable, for efficiency of operation, that, when the control lever is moved to neutral position to stop the operation of the work spindle for loading and unloading purposes, the spindle be prevented from coasting due to the velocity of the parts forming the spindle drive. Accordingly, a braking mechanism is provided in the drive for the spindle. It is advantageous that such a braking mechanism be rendered effective automatically by the control lever 104 which brings about the stopping of the spindle and that the braking resistance be automatically variable in proportion to the speeds of operation of the spindle, it being well understood that the greater the speed of operation for the spindle the greater will be the braking resistance required to effect a quick stopping thereof. Mechanism for accomplishing these ends will now be described.

The shaft 40 is provided with a brake drum 114 against which operates a segmental brake shoe 115 carried by a pin 115a that extends through an opening in a bracket in the head and carries a spring 115b which constantly urges the brake shoe into brake releasing position. One end of the brake shoe 115 is pivotally connected to a link 116 which in turn is pivotally mounted between spaced lugs 116a carried by the rear wall of the head. It will be noted that the lugs 116a are spaced a substantial distance apart so that the end of the link 116 arranged therebetween will be relatively wide, thus imparting stability to the link against lateral movement and holding the brake shoe in alignment with the brake drum. The link 116 adjacent its point of pivotal connection to the brake shoe 115 is provided with an upstanding cam 116b which cooperates with a similar downwardly extending cam 117a arranged on the under side of a foot member 117 fixedly carried by a rod 118 rotatably and vertically movable in suitable supports in the head and urged upwardly by the spring 118a. The vertical position of the rod 118 may be adjusted from a position outwardly of the cover of the head by an adjusting screw 118b provided with a suitable lock nut, as shown in Fig. 15.

The rod 118 has fixed thereto a gear segment 119 which meshes with a rack formed on the end of a forwardly extending portion 60b of the sleeve 60a which carries the yoke member 60 for shifting the friction clutches for controlling the starting, stopping, and reversing of the work spindle, as previously explained.

It will be seen that when the control lever 104 is moved horizontally to neutral position to disengage the friction clutches, the rod 118 will be rocked by the rack on the portion 60b and the gear segment 119, wherefore the cam 117a will be brought into engagement with the cam 116b, thus depressing the link 116 and applying the brake shoe to the brake drum. When the control lever 104 is swung horizontally away from neutral position, the rod 118 will again be rocked and the cam 117a will move out of engagement with the cam 116b, whereupon the spring 115b will move the brake shoe 115 to brake releasing position.

As previously stated, the braking resistance applied to the brake drum 114 should vary in direct proportion to the speed of operation of the work spindle.

In order that this variation of the braking resistance may be obtained automatically as the operator changes the speeds of operation of the work spindle and in proportion to such speeds, the shaft 83 which is operated by the speed selecting dial 81 is provided with an extension 83a, see Fig. 15, supported for rotative movement in a sleeve 120 and having fixed to its end a bevel gear 83b. The sleeve 120 is rotatably mounted in a bearing boss on the under side of the cover 30a and includes at one end a cam 120a and at its opposite end a gear 120b.

The cam 120a has its periphery in the form of a spiral with points thereon gradually increasing in distance radially from the center of the cam. The lowest and highest points of the periphery of the cam are in relation, respectively, to the lowest and highest speeds of operation of the work spindle, while the intermediate points of the periphery are in relation to the intermediate speeds of operation of the spindle.

The pointed upper end of a vertically movable rod 121 is in engagement with the periphery of the cam 120a (see Figs. 15 and 16), and the rod is slidably carried by spaced brackets formed in the cover and the head and has fixed to its lower end an L-shaped brake shoe support 122 that is pivotally connected to the end of the brake shoe 115 opposite the end thereof to which the link 116 is pivotally connected. It will be seen that, when the cam 120a is in a position wherein the end of the rod 121 is in engagement with the lowest point on the periphery of the cam, the rod 121 is in its most upward position.

Assuming that the operator turns the dial 81 to the highest speeds of operation of both series for the work spindle (indicated on the dial in the drawings above the letter N and by the numerals 1316 and 658), the cam 120a will turn by means later to be described so that the end of the rod 121 now engages the periphery of the cam adjacent its highest point, and consequently the rod 121 is depressed downwardly and the brake shoe 115 will accordingly be lowered so that, when the brake shoe is applied by the mechanism previously described, the maximum frictional braking resistance will be provided.

Assuming that the operator turns the dial to obtain the lowest speeds of operation of the two series of the work spindle, that is, to the position indicated by the numerals 52 and 26 shown on the dial 81 below the letter N, the cam 120a will be moved accordingly in the opposite direction from that previously referred to and the end of the rod 121 will engage the periphery of the cam near its lowest point, wherefore the braking resistance of the brake shoe 115, when it is applied to the brake drum 114, will be considerably less than in the instance last referred to. It will be understood that for the intermediate speeds of operation of the work spindle the end of the rod 121 will be in engagement with the periphery of the cam 120a between the lowest and highest points and that the braking resistance of the brake shoe will vary proportionately to the operating speeds of the work spindle.

In order to adjust the braking mechanism to suit varying conditions, the necessary adjustments may be made by means of the adjusting screw 118b which is accessible and located outside the head. It will also be understood that in some instances no braking action for the work spindle drive is required, in which event the adjusting screw 118b is moved to a position such that the spring 118a will move the rod 118 upwardly where the cam 117a will not operatively engage the cam 116b and the spring 115b will move the brake shoe away from the drum until a shoulder on the upper side of the brake shoe abuts with the supporting bracket for the pin 115a.

The means for adjusting the cam 120a to vary the braking resistance in proportion to the speed of operation of the work spindle will now be described. The bevel gear 83b on the end of the shaft 83a meshes with a bevel gear 83c fixed to shaft 83d rotatably mounted in the cover 30 and extending in a direction transversely to the shaft 83a (see Fig. 16a). A pair of spools 83e and 83f are splined on the shaft 83d to rotate therewith and move endwise thereon. In Fig. 16 the spools 83e and 83f are shown in a developed view, it being noted that each spool is provided with thirteen steps, one of said steps representing the neutral position of the dial 81 and an inactive condition of the work spindle when the front two-step gear cone is disengaged therefrom while the twelve remaining steps relate to the series of spindle speeds indicated on the dial 81. It will be seen that, when the dial 81 is rotated when the gear shifting spools 79—79a and also the spools 83e and 83f are in their outermost position, the shafts 83a and 83d will be rotated as will the spools on said shaft 83d In order that the endwise movement of the spools 83e and 83f is correlated to the endwise movement of the spools 79—79a and controlled by the control lever 104, the following arrangement is provided:

The disc 98 is provided with a lug of a predetermined length, see Fig. 2, to which is pivotally connected a link 98a adjustable as to length. The opposite end of the link 98a is provided with a fork 98b straddling the ends of levers 98c and 98d. The fork 98b is pivotally connected to the lever 98d by means of a pin, which pin extends through a slot formed in the end of the lever 98c. Movement of the link 98a will occasion a substantially equalized movement of the levers 98 and 98d. The levers 98c and 98d are fixed to the upper ends of vertically extending rockable shafts 98e and 98f, respectively, while the lower ends of said rockable shafts have fixed thereto laterally projecting lever arms 98g and 98h, see Figs. 15 and 16a. The lever arms 98g and 98j carry at their ends pins engaging the annular grooves in the spools 83e and 83f, respectively It will be seen that when the control lever 104 is raised to move the spools 79—79a outwardly the spools 83e and 83f through the linkage and levers just described will also move endwise on the shaft 83d to their most outward position. A rack bar 120c is slidably mounted in the wall and a bracket of the cover 30a and the rack portion thereof meshes with the gear 120b on the sleeve 120 which carries the cam 120a. The rack bar 120c is provided with a laterally extending arm 120d having at its end an upstanding pin 120e located between the spools 83e and 83f.

It will be seen that the spools 83e and 83f, after they have been moved to their most outward position and then indexed by the movement of the dial 81 to a position relative to the selected spindle speed, will when they are moved inwardly engage the pin 120e to shift the rack bar 120c and since the rack portion of the latter meshes with the gear 120b on the sleeve 120, the cam 120a will be adjustably turned to a position such that it will vary the braking resistance in proportion to the speed of operation of the spindle when the latter is next stopped.

In order to more clearly bring out the novel features residing in the present invention, the sequential operation of the machine as thus far described will now be set forth.

Assuming that the machine is at rest and the control lever 104 is standing in neutral position and the dial 81 is positioned with the letter N in line with the pointer 82 with the forward two-step gear cone in the inoperative position, the tongue 106a of the block 106 within the hub 103 is in engagement with the notch 108a in the stationary block 108, wherefore the control lever 104 is locked against movement horizontally. At this time the rod 121 will be in engagement with the lowest point of the periphery of the cam 120a, and assuming that the proper adjustment has been given to the screw 115b, the brake shoe is applied to the brake drum 114 with a pressure suitable for the lowest speed. At this time the two-part lever 110—111 will be positioned as shown in Fig. 5 while the locking pin 109 will be in engagement with the recess in the under side of the U-shaped portion 63a of the shaft 63 and the levers 65, 68, and 70 will be free to move, except that the spools 79 and 79a are positioned inwardly as shown in Fig. 8, thus holding the levers in their prior position.

The dial 81 is at this time locked against rotation by the locking pin 90 which is in engagement with the periphery of the rod 94. When the operator desires to start the operation of the work spindle, he raises the control lever 104 to its uppermost position to rock the hub 103 about its horizontal axis and through the link 101 to rock the disc 98 and the shaft 97 to move the spools 79 and 79a outwardly by means of the equalizer bar 96 to the position shown in Fig. 10, at which time the locking pin 90 is free to move into the recess 95 in the rod 94 to allow the spools to be rotated by the dial. This upward movement of the control lever 104 acts also through the link 98a to effect a movement of the spools 83e and 83f to their most outward position. The operator now turns the dial 81 until the number corresponding to the desired speed is in line with the pointer 92, the spools 79 and 79a turning correspondingly during rotation of the dial to bring the proper projections of the spools in line with the pins of the shifting levers, while the turning movement of the spools 83e and 83f brings the proper steps thereon in alignment with the pin 120e of the rack 120c. The operator now moves the control lever 104 downwardly to its lowermost position to bring the spools 79 and 79a inwardly to shift the shifting levers and the gear cones operated thereby to attain the desired speed and to bring the spools 83e and 83f inwardly to shift the rack bar and adjust the braking resistance. During the downward movement of the control lever 104, the tongue 106a of the block 106 within the hub 103 is swung in a counter-clockwise direction by engagement of the shoe 105 therewith until the tongue 106a has moved out of the notch 108a and into the segmental groove in the stationary block 108, as shown in Fig. 4. The operator may now swing the control lever 104 horizontally to engage one or the other of the friction clutches for forward or reverse direction of operation of the work spindle. During this last named movement of the control lever 104, the recesses 63b move out of alignment with the locking pin 109 and the latter is depressed to swing the two-part locking lever 110—111 in a clockwise direction to engage the locking teeth 111a and 111b with the locking recesses on the levers 65, 68, and 70. Also during this last mentioned movement of the control lever and the engagement of the friction clutches, the rod 118 will be rocked through the engagement of the segmental gear 119 with the rack on the extension 60b of the sleeves 60a to cause the cam 117a to move out of engagement with the cam 116b to release the brake.

It will be noted that the work spindle 32 is now operating at the desired speed and work may now be performed and that the spools 79 and 79a and also the spools 83e and 83f are in their most inward position and are locked against rotation by the engagement of the locking pin 90 with the periphery of the rod 94, thus preventing movement of the dial 81 and shafts 83a and 83d. It will also be noted that at this time the levers 65, 68, and 70 are locked against movement.

During the operation of the machine at the selected speed, the operator can preselect the speed for the next operation and automatically presets the braking resistance in proportion to such speed in the manner now to be described.

The control lever 104 is raised to its uppermost position without imparting to the lever any horizontal movement. The upward movement of the control lever can take place even though the tongue 106a of the block 106 is in the groove in the stationary block 108 and is not in registry with the notch 108a, since the hub 103 can move relative to the block 106 as it merely has a frictional connection therewith through the shoe 105. The upward movement of the lever 104 moves the spools 79 and 79a to their outermost position, as shown in Fig. 10, as well as the spools 83e and 83f, and the lever will be held in said upper position by the friction shoe 105. The outward movement of the spools 79 and 79a will disengage the spools from the pins carried by the levers 65, 68, and 70, but the levers cannot be shifted since they are locked in position by the teeth 111a and 111b. The outward movement of the spools 83e and 83f releases the pin 120e of the rack bar 120c, but since the pin 121 bears against the periphery of the cam 120a there is no tendency for the back bar and the sleeve 120 to move. As previously explained, all the spools are free to rotate when in their outermost position, and the dial may now be turned by the operator to select the desired speed for the next operation of the spindle and to preset the braking resistance, the spring point 89 of the yoke 87 holding the spools and the dial in the adjusted or selected positions. As soon as the first operation has been completed and it is desired to change the spindle speed and braking resistance to that preselected for the next operation, the operator moves the control lever 104 horizontally while elevated to neutral position without imparting any vertical movement thereto. This movement of the control lever 104 disengages the clutch and automatically applies the brake with a braking resistance related to the present spindle speed and acts to disengage the locking teeth 111a and 111b from locking engagement with the levers 65, 68, and 70 to permit the same to be shifted to shift the gear cones. The operator now brings the lever downwardly to its lowermost position to move the spools 79 and 79a inwardly to shift the lever 65, 68, or 70 and in turn the gear cones to change the gear ratio for the desired and preselected speed of operation of the spindle. The downward movement of the control lever also brings the spools 83e and 83f inwardly to shift the rack bar 120c to adjust the cam 120a to vary the braking resistance, when the brake is next applied, in proportion to the new spindle speed. After the downward movement of the control lever has been effected, the lever is moved horizontally to release the brake and to again engage one or the other of the friction clutches to operate the spindle in either the forward or the reverse direction and at the newly selected speed.

It will be noted that, whenever the operator moves the control lever 104 into neutral position and releases the same, the spring 107 will move the block 106 until the tongue 106a is in the notch 108a at which time the rear or right-hand under side of the block will abut the U-shaped portion 63a of the shaft 63 and the block will be held against further movement, see Fig. 5. The hub 103 and the control lever 104 move with the block because of the engagement of the friction shoe 105 therewith, while the control lever is held in a slightly elevated position and in neutral.

In actual practice, after the next speed for the spindle has been preselected at the proper time, the operator moves the control lever to neutral to stop the spindle drive and continues to move the control lever downwardly to shift the gears and continues this movement horizontally to re-engage the friction clutch to again operate the spindle in forward or reverse direction and at the newly selected speeds. It will be understood that the braking action previously referred to does not at once stop the spindle drive but allows a certain amount of coasting of the spindle drive. However, should the operator delay the continuous downward movement of the control lever after he has brought it to neutral in its upper position, the work spindle drive may stop prematurely, with the result that when the lever is brought downwardly to shift the gear cone the gears may not properly intermesh while standing still. When this condition occurs, the gear shifting cannot be completed and the locking teeth 111a and 111b will engage the high points of the extensions on the levers 65, 68, and 70 and not in the recesses formed in the edges thereof. The operator then will give the control lever a horizontal movement to partially engage one or the other of the friction clutches to start the drive momentarily in operation and will then restore the control lever to neutral and quickly bring it downwardly to complete the shifting of the gears.

It will be noted that during the horizontal movement of the control lever 104 while in the partially elevated position just referred to, the two-part locking member 110—111 will be brought inwardly to locking position through the action of the locking pin 109, but, since the teeth 111a and 111b are not in registry with the recesses in the extensions on the shifting levers, they cannot move to a fully locked position. However, inasmuch as the lever 110 may have relative movement with respect to the lever 111, the former will be rocked and will compress the spring 113, while the lever 111 remains stationary. As soon as the control lever 104 has started the spindle drive and has been returned to neutral position, the locking pin 109 moves upwardly into engagement with the recess 63b and the levers 110 and 111 of the two-part locking member return to the position shown in Fig. 5, the compressed spring 113 acting to move the levers to this position and in conjunction with the spring 110b. The parts of the drive are now spinning from the quick engagement and disengagement of the clutch and the control lever can now be brought completely down to fully shift the gears.

There has been described so far a construction wherein the dial 81 and the spools 79 and 79a are turned manually to select or preselect the different speeds of operation of the work spindle. This turning of the dial and the spools may be accomplished automatically by means of a power mechanism now to be described, which mechanism is under the control of the control lever 104 which, as will be remembered, moves the spools inwardly to shift the gears and outwardly to allow rotation of the spools, and actuates the friction clutches as well as the brake mechanism for stopping the spindle. The power drive may be operated from a source of power independent of the machine or, as herein illustrated, it may be driven from the pulley shaft of the machine. The pulley shaft 34 is provided adjacent the pulley 33 with a small pulley 123 receiving a belt 124 extending around a smaller pulley 125 carried by a stub shaft 126 rotatably mounted in a housing member 127 secured to the end of the cover 30a of the head, as viewed in Fig. 2. The stub shaft 126 has fixed to its inner end a bevel pinion 128 which meshes with a similar pinion 128a fixed on a worm shaft 129 rotatably mounted in the housing member 127 and extending transversely thereof. The shaft 129 is provided with a worm 129a which meshes with a worm wheel 130 carried by a sleeve 130a freely rotatable on an extension of the previously mentioned shaft 80, the end of the extension of the shaft 80 being supported in the housing member 127. A clutch member 131 in the form of a sleeve is splined on the sleeve 130a to rotate therewith and have endwise movement thereon. The inner face of the clutch member 131 is provided with a plurality of spaced, narrow clutch teeth 131a which, when the clutch member 131 is moved in one direction, lie between widely spaced clutch teeth 132 projecting from the outer face of a star wheel 132a fixed to the extension of the shaft 80. The clutch member 131 is moved axially of the sleeve 130a by means of a lever 133 having a shoe 133a at its lower end engaging a circular groove in the clutch member 131, while the upper end of the lever 133 is fixed to a stub shaft that is rockably mounted in a boss in the side wall of the housing member 127 and has fixed to its outer end a downwardly extending lever 134, see Figs. 2 and 3.

The lower end of the lever 134 is pivotally connected to a fork carried by a slidable rod 135 extending horizontally into the cover 30a of the head and supported in the wall thereof and by a lug arranged within the cover. A spring 135a is arranged on the rod 135 outwardly of the cover and between the wall thereof and the fork on the rod, and said spring acts at all times to urge the clutch into a disengaged position. Intermediate the wall and the lug which supports the rod 135 and within the cover 30a, the rod is provided with a collar 135b fixed thereto, see Fig. 2.

The sleeve 93 previously referred to is provided with a downwardly extending portion 93b, see Fig. 4, which has at its lower end a forked portion straddling the rod 135, as clearly shown in Figs. 2 and 4. The portion 93b of the sleeve 93 straddles the rod 135 between the collar 135b and the end wall of the cover 30a, wherefore, when the spools 79 and 79a are moved to their outermost position by the upward movement of the control lever 104, the sleeve 93 moves in a direction such that the portion 93b will slide along the rod 135 toward the collar 135b, and just prior to the end of the movement of the sleeve 93, the portion 93b abuts the collar 135b and moves the rod against the tension of the spring 135a, thus causing the clutch member 131, through the levers 134 and 133, to move toward the star wheel 132a and to position the teeth 131a between the widely spaced teeth 132 to drive the shaft 80 (see Figs. 2 and 9), wherefore, the star wheel 132a, the spools 79, 79a, and the dial 81 are rotated by power.

As has been previously explained, the teeth 131a of the clutch member 131 are relatively narrow as compared with the spaces between the teeth, while the teeth 132 on the star wheel 132a are also widely spaced apart. A lever arm 136 is pivotally mounted in the housing member 127 and carries at its free end a roller 136a which engages the peripheral teeth of the star wheel (see Fig. 3) and a spring 136b acts to urge the roller 136a into engagement with the peripheral teeth of the star wheel.

Assuming the teeth 131a of the clutch member 131 have engaged the clutch teeth 132 of the star wheel 132a, the star wheel will be turned and the roller 136a will ride over the high point of a peripheral tooth of the star wheel, whereupon the spring 136b, acting upon the lever 136, imparts to the star wheel a movement ahead of the driving movement, with the result that the rotation of the star wheel is intermittent, inasmuch as the slowly operated clutch member only drives the star wheel until the roller passes the high point of the peripheral tooth, whereupon the spring 136b causes the star wheel to jump ahead of the clutch drive, providing momentary periods of rest for the star wheel.

It will be remembered that the dial 81 is operatively connected with the shaft 80 and the star wheel 132a and hence the intermittent movement of the star wheel moves the dial intermittently, wherefore, the operator has sufficient time to disengage the power drive for the dial movement when the dial has turned to the proper position for the desired speed for the work spindle. It will also be noted that the intermittent movement thus imparted to the shaft 80 results in an intermittent or step-by-step rotation of the spools 79 or 79a and through the shafts 83a and 83d of the spools 83e and 83f.

In the operation of the machine when equipped with the power drive for the spool shaft 80 and dial 81, as just described, the operator raises the control lever 104 to its most upward vertical position to bring the spools 79, 79a, 83e, and 83f to their outermost position and to start the power drive for the shaft 80 during the last portion of the upward movement of the lever. With the control lever in its upper position and the power drive imparting the step-by-step rotative movement to the dial 81 and spools 79, 79a, 83e and 83f, the operator watches the dial until it has turned to bring the numeral representing the speed desired in line with the pointer 82, whereupon he moves the control lever 104 slightly downwardly to disengage the clutch 131 from the star wheel 132a and thus stop the intermittent drive of the shaft 80 and the dial 81. In instances where the operator is preselecting the speed of operation for the next operative step of the spindle, he merely brings the control lever 104 downwardly sufficiently far to disengage the clutch 131, as has been stated, and then when the current operation of the work spindle has reached its conclusion, he moves the control lever to neutral position, as will be remembered, to disengage the friction clutch and apply the brake, and then downwardly to bring all of the spools inwardly to shift the gear cones to change the speed of the spindle to the preselected speed and to preset the braking resistance, after which the operation is continued, as has been previously set forth, by shifting the control lever horizontally to release the brake and to connect the power drive to the work spindle in forward or reverse direction.

Reference should now be made to Figs. 18 to 25, inclusive, wherein is shown a modified form of construction from that previously described. The modified construction will now be described, and it will be noted that it differs from the former construction in that it employs a pair of spools for shifting each gear cone, thus using three pairs of spools, while the former construction employed only a single pair of spools for shifting all of the three gear cones.

The dial 81 in the modified construction is in substantially the same location and serves the same purpose as the dial 81 in the construction previously described. In the second instance, however, the dial is fixed to a shaft 137 extending horizontally into the cover 30b of the head and having fixed to its inner end a bevel gear 138 which meshes with a bevel gear 139 fixed to the end of a horizontal shaft 140 rotatably mounted in the cover 30b, see Fig. 20. The bevel gear 139 is formed on a sleeve which also has formed thereon, inwardly of the bevel gear, a spur gear 139a and, outwardly of the bevel gear, a second spur gear 139b. The spur gear 139a meshes with the spur gears 141 and 142 fixed to parallel rotatable shafts 141a and 142a mounted in the cover 30b, as shown in Fig. 25, while the outer spur gear 139b meshes with a spur gear 143 fixed to the end of a rotatable shaft 143a parallel to the shafts 140, 141a, and 142a. The ratio between the spur gear 139a and the spur gears 141 and 142 is one to one, while between the spur gear 139b and the spur gear 143 it is two to one, in other words, the gears 141 and 142 with their shafts 141a and 142a are given one complete revolution for a complete revolution of the dial, while the gear 143 with its shaft 143a is given two revolutions for a complete revolution of the dial, it being noted that the bevel gears 138 and 139 are of equal size.

The shaft 141a has splined thereto a pair of spools 144 and 144a, see developed view in Fig. 24, which control the shifting of the rear two-step gear cone. The shaft 142a has splined thereto a pair of spools 145 and 145a, see Fig. 18 and developed view in Fig. 23, which control the shifting of the front two-step gear cone, while the shaft 143a has splined thereto a pair of spools 146 and 146a, see Fig. 20 and the developed view of Fig. 22, which control the shifting of the three-step gear cone.

The shafts 141a, 142a and 143a are arranged at equal radial distances with respect to the shaft 140, wherefore circular flanges 147a and 148a formed adjacent the outer ends of members 147 and 148 freely slidable on shaft 140 engage in grooves formed in each of the spools just referred to (see Figs. 18 and 20), so that, when the members 147 and 148 are moved equal distances inwardly and outwardly on the shaft 140, the three spools 144a, 145a, and 146a are moved by the member 148 and the three spools 144, 145, and 146 are moved by the member 147.

In order to move the members 147 and 148 inwardly and outwardly equal distances on the shaft 140, the members are provided with rack portions 147b and 148b which mesh respectively with intermeshing identical gear segments 149 and 150. It will be seen that movement of one gear segment to move its associated rack member will impart a corresponding movement to the other gear segment and its associated rack member and will, therefore, impart equal movements to the members 147 and 148.

The gear segment 149 is fixed to a rockable shaft 151 mounted in the cover 30b of the head and extending above the upper side of the same where it has fixed thereto a disc 152 (see Fig. 18). The gear segment 150 is carried by a vertical stub shaft 150a mounted in suitable brackets in the cover 30b. The disc 152 is similar to the disc 98, previously described, except that the rod 153, similar to the rod 99, is connected to and extends from the disc 152 in the opposite direction, as clearly shown in Fig. 21. The rod 153 is pivotally connected to a part 100a of a two-part link and in turn said part is adjustably connected to a second part 101a of the two-part link, the two-part link corresponding to the two-part link 100—101 previously described, and being connected to the hub 103a by the fork 102a in the same manner as in the first described embodiment. The hub 103a is identical with the hub 103 previously described and has connected thereto the control lever 104a, similar to control lever 104, which extends beyond the front of the head above the dial 81.

The shifting lever 154 for the front two-step gear cone is identical with the shifting lever 70 previously described, and is actuated by the spools 145 and 145a through the medium of a pin 155 arranged between the spools 145—145a and carried by a lever arm 156 similar to the lever arm 75 previously referred to.

The lever arm 156 is connected through a link 157 similar to the link 74 with a lever arm 158 similar to lever arm 73 and operatively connected with a vertically extending shaft 159 that has fixed to its lower end the shifting lever 154. The rear two-step gear cone is shifted by the spools 144—144a through the medium of a pin 160 arranged between said spools and carried by a lever arm 161 similar to the lever arm 68 previously described.

The three-step gear cone is shifted through the medium of a pin 162 located between the spools 146—146a and carried by a lever arm 163 similar to lever arm 67 and fixed to a vertically extending rockable shaft 164 which has fixed to its lower end a shifting lever 165 that is operatively connected with the three-step gear cone and corresponds to the shifting lever 65.

The shifting levers 154, 161, and 165 are provided with recessed extensions into which engage the teeth 111a and 111b in exactly the same way as do the similar teeth with respect to the levers 65, 68, and 70.

In this embodiment, the various parts not specifically referred to operate and function in exactly the same way as do the corresponding parts in the embodiment previously described. It will be understood that the braking mechanism and also the power drive for the dial described with reference to the first embodiment can be applied to the embodiment just explained, but, since they are the same in both instances, they are not illustrated with respect to the second embodiment in order to avoid mere repetition.

It will be noted in connection with the modified form of construction that three pairs of spools are employed for shifting the gear cones instead of the one pair used in the first embodiment. Therefore, the three series of projections formed on the spools of the single pair of the first embodiment have been separated and applied respectively to the individual pairs of spools of the second embodiment. In addition, the spools of the pair which control the shifting of the three-step gear cone are given two rotations for one rotation of the dial, wherefore, the projections of said spools may be made coarser and will function twice for each complete revolution of the dial.

Inasmuch as the three-step gear cone must have a neutral point and the spools for controlling said cone make two revolutions for one revolution of the dial, then the spools for controlling the two-step gear cones, which make one revolution for one revolution of the dial, must have two neutral points. Consequently, the dial 81 in the second embodiment will have fourteen spaces rather than thirteen spaces, as in the first embodiment, and two neutral points at which the work spindle is disconnected from its drive for the purpose of loading and unloading.

In large size machines, the force required for moving the spools endwise and shifting the gears may be so great that it cannot be readily or efficiently done manually by the operator. In order to obviate this difficulty, it is proposed, if desirable, to employ power means controlled by the previously described movements of the control lever 104b for moving the spools endwise and for shifting the gears.

In Figs. 26 and 27 there is illustrated a power means for this purpose in the form of a hydraulic motor controlled by the movements of the control lever 104b. The cover 30c of the head has fixed to its upper side a cylinder 166 in which operates a piston 167 fixed on the end of a piston rod 167a which carries at its outer end a block 167b having a transverse slot formed therein. A lever 168 is fixed to the upper end of the rockable shaft that actuates the spools inwardly and outwardly, similar to the shafts 97 and 151, and said lever 168 is provided adjacent its end with an upstanding roller 168a engaging in the transverse slot in the block 167b, wherefore, inward and outward movements of the piston 167 effect a rocking movement of the lever 168 and endwise movements of the spools.

The cylinder 166 is provided with ports 166a and 166b on opposite sides of the piston 167 and said ports are connected by conduits 169 and 170 with the body of a control valve 171. The body of the control valve 171 is also connected by suitable conduits 172 and 173 with the source of fluid under pressure, including a pump, not shown, having the usual bleeding valve.

The passage of the pressure fluid through the valve body and the conduits 169 and 170 is controlled by a valve proper 171a carried by a rod projecting outwardly of the front of the valve body and connected with a bell-crank lever 174 having an arm 174a extending beneath an extended portion 103c on the rear of the hub 103b. A spring 175 acts to move said bell-crank 174 to the position shown in Fig. 27 when the control lever 104b is in its lower or substantially horizontal position.

It will be understood that when the control lever 104b is elevated by the operator, the valve proper will be so positioned that the pressure fluid will flow into the cylinder 166 at the proper side of the piston 167 to move said piston in the required direction to rock the lever 168 to move the spools an equal distance outwardly to allow the same to be indexed, and when the control lever 104b is moved vertically downwardly, the valve proper will be shifted by the spring 175 so that a reverse direction of movement of the piston 167 will take place and the spools will be moved inwardly to shift the gears in the spindle drive. It will be noted that the extended portion 103c of the hub 103b is of arcuate shape, wherefore, the hub 103b can be rocked horizontally by the control lever 104b for forward or reverse drives of the spindle and in such position can be elevated and the extended portion 103c brought into engagement with the arm 174a of the bellcrank 174.

It will be understood that the means for operating the spools by power to index the same (as shown in Fig. 2) may be readily used in combination with the hydraulic means for moving the spools endwise, as has just been described. It will be further understood that the braking means for the spindle drive previously explained may be used with the embodiment employing the hydraulic motor for shifting the spools endwise.

It will be remembered that the rods 99 and 153, the two-part links 100—101 and 100a—101a and forks 102—102a are adjustable with respect to the members to which they are connected or, in the case of the links, with respect to the two parts thereof. The adjustability of these parts enables the leverages of the rods and the forks to be varied while the length of the two-part link may also be varied. This adjustability is provided to regulate the leverages and link connections so that the upward movements of the control levers 104 and 104a to their most upper positions act to bring the spools, both in the form employing a single pair of spools and in the form employing three pairs of spools, to their most outward or separated positions. The adjustability also enables the most inward position of the spools to be definitely related to the position of the control levers when the latter are in a substantially horizontal position with respect to the head.

The advantages of the arrangement just referred to are that the parts can be made for different heads and with varying leverages and then can be adjusted to suit the conditions incident to the particular head and the required movement of the spools for the heads of various machines.

It will be remembered that, in the particular machines described, the gear train for the spindle drive is such that twelve different speeds of operation can be imparted to the spindle both when the driving motor is operated at high speed and at low speed and by means of three shiftable gear cones. Therefore, in order to obtain certain speeds of operation of the spindle, it will be necessary, after selecting or preselecting the desired speed, to shift two or more of the gear cones.

Inasmuch as the shifting of the gear cones is accomplished by a single movement of the control lever and the inward movement of the spools, it will be seen that, unless provision is otherwise made, the gear train in the drive for the spindle will be broken at two or more points simultaneously, which might result in an undesirable slowing up or stopping of certain parts of the gear train, and, therefore, may, if the gears should not correctly mesh, prevent the shifting of the gear cones.

Provision has been made to obviate this difficulty in the machines embodying the invention by designing the lengths of the projections on the spools in such manner that the pins effecting the shifting of the various gear cones are shifted in a predetermined sequence. In addition to this, the shifting levers associated with said pins are of predetermined length to further assure the desired predetermined sequence of shifting movement for the gear cones.

The shifting levers 67 and 163, which respectively shift the three-step gear cones in the form employing a single pair of spools and in the form using three separate pairs of spools, are relatively short and therefore effect a quick shifting movement of the three-step gear cones.

The shifting levers 68 and 161 for shifting, respectively, the rear two-step gear cones in both forms, are longer than the levers 67 and 163 and, therefore, shift the rear two-step gear cones more slowly than the three-step gear cones are shifted by their shifting levers.

The shifting levers 75 and 156 for the front two-step gear cones are relatively long and act through the links 74 and 157 and the relatively short intermediate levers 73 and 158 upon the levers 70 and 154 which are relatively long. In this instance there are long levers acting through short levers upon long levers, with the result that the shifting movements of the front two-step gear cones are slower than the shifting movements of the rear two-step gear cones and much slower than the shifting movements of the three-step gear cones.

The sequence in which the gear cones will be shifted may be stated as follows:

The gear cone which is nearest the pulley shaft or power drive 34, in this instance the three-step gear cone, will be shifted and a gear thereon brought into partial engagement with its new mating gear before the rear two-step gear cone has been shifted out of engagement with its old mating gear, while the new gear on the rear two-step gear cone will be partially engaged with its new mating gear before the old gear on the front two-step gear cone has moved out of engagement with its old mating gear. In other words, where two or more of the gear cones are to be shifted, the cone nearest the source of power (the pulley shaft) will be shifted first and brought partially into engagement with a new mating gear before the next cone in the drive train which is to be shifted has been moved out of engagement with its old mating gear. In this way the gear train, regardless of the number of gear cones to be shifted, will never be broken in more than one place at a time.

It will be understood that, although the drive train for the spindle has been illustrated herein as including three gear cones, the invention may be applied to and will function equally as efficiently in a drive train employing a greater or a lesser number of gear cones.

Although several embodiments of the invention have been illustrated and described herein, it will be understood that the invention is not to be limited thereto and that it is susceptible of various modifications and adaptations within the scope of the appended claims.

Having thus described my invention, I claim:

1. In a machine tool having a part to be moved at different speeds, driving means for moving said part, speed changing means for said part including a device movable in one direction during the movement of said part to preset it for a certain speed and movable in another direction when said driving means is disconnected from said part to actuate said speed changing means to obtain said speed, and a single control member for controlling said device during its latter movement and for controlling said driving means.

2. In a machine tool having a part to be moved at different speeds, driving means for moving said part, speed changing means for said part including a device rotatable during the movement of said part to preset it for a certain speed and linearly movable when said driving means is disconnected from said part to actuate said speed changing means to obtain said speed, and a single control member controlling said device during its linear movement and for controlling said driving means.

3. In a machine tool having a part to be moved at different speeds, driving means for moving said part, speed changing means for said part and including a device rotatable during the movement of said part to preset it for a certain speed and endwise movable when said driving means is disconnected from said part to actuate said speed changing means to obtain said speed, and a single control member for controlling said device during its endwise movement and for controlling said driving means.

4. In a machine tool having a part to be moved at different speeds, driving means for moving said part, speed changing means for said part including a plurality of devices movable in one direction during the movement of said part to preset the same for a certain speed and movable in another direction when said driving means is disconnected from said part to actuate said speed changing means to obtain said speed, and a single control member for controlling said devices during their latter movement and for controlling said driving means.

5. In a machine tool having a part to be moved at different speeds, driving means for moving said part, speed changing means for said part including a pair of devices having a portion of said speed changing means arranged therebetween to be actuated thereby, said devices being movable in one direction to preset the same for a certain speed and movable in another direction to actuate said portion of said means to obtain said speed, and a single control member controlling said devices during their latter movement and for controlling said driving means.

6. In a machine tool having a part to be moved at different speeds, driving means for moving said part, speed changing means for said part including a pair of devices having a portion of said speed changing means arranged therebetween, said devices being rotatable to preset the same for a certain speed and being endwise movable to actuate said portion of said speed changing means to obtain said speed, and a single control member for controlling the endwise movement of said devices and for controlling said driving means.

7. In a machine tool having a part to be moved at different speeds, driving means for moving said part, change speed gearing for varying the speed of said part, means for shifting the change speed gearing and including a device movable in one direction during the movement of said part to preset it for a certain speed and movable in another direction when said driving means is disconnected from said part to shift said gearing to obtain said speed, and a single control member for controlling said device during its latter movement and for controlling said driving means.

8. In a machine tool having a part to be moved at different speeds, driving means for moving said part, change speed gearing for varying the speed of said part, means for shifting said change speed gearing and including a device rotatable during the movement of said part to preset it for a certain speed and linearly movable when said driving means is disconnected from said part to shift said gearing to obtain said speed, and a single control member for controlling said device during its linear movement and for controlling said driving means.

9. In a machine tool having a part to be moved at different speeds, driving means for moving said part, change speed gearing for varying the speed of said part, means for shifting said change speed gearing including a pair of devices having therebetween means operatively associated with said change speed gearing, said devices being movable in one direction to preset the same for a certain speed and movable in another direction to actuate the means therebetween to shift said gearing to obtain said speed, and a single control member for controlling the latter movement of said devices and for controlling said driving means.

10. In a machine tool having a part to be moved, driving means for moving said part, gear means for connecting and disconnecting said part with said driving means, and a device movable in one direction to preset it for disconnecting said gear means with respect to said part and movable in another direction to effect said disconnection, and a single control lever for controlling said device during its latter movement and for controlling said driving means.

11. In a machine tool having a part to be moved, driving means for moving said part, gearing for connecting and disconnecting said part with respect to said driving means, means for shifting said gearing, a pair of devices arranged on opposite sides of a portion of said last named means and rotatable to preset said devices for disconnecting said gearing from said part and movable toward each other to actuate said last named means to shift said gearing to effect a disconnection of the same from said part, and a single control member controlling the last named movement of said devices and for controlling said driving means.

12. In a machine tool having a rotatable spindle and driving means for rotating said spindle, gearing for connecting and disconnecting said spindle with said driving means and including a gear cone having gears adapted to mesh with gears fixed to said spindle, a lever for shifting said gear cone, a pair of devices arranged on opposite sides of said lever and rotatable to preset said devices for disconnecting said gearing from said spindle and movable toward each other to actuate said lever to shift said gearing to effect a disconnection of the same from the spindle, and a single control member controlling the last-named movement of said devices and controlling said driving means.

13. In a machine tool having a part to be moved at different speeds, driving means for moving said part, speed change means for said part including a device movable in one direction to preset it for a certain speed and movable in another direction to actuate said speed change means to obtain said speed, and a single control member for controlling the movements of said device and for controlling said driving means.

14. In a machine tool having a part to be moved at different speeds, driving means for moving said part, speed changing means between said driving means and said part for imparting a series of different speeds to the latter, braking means for said part, and means for adjustably presetting the braking means to vary the braking resistance thereof in proportion to the next speed of movement of said part in said series.

15. In a machine tool having a part to be moved at different speeds, driving means for moving said part, speed changing means between said driving means and said part for imparting a series of different speeds to the latter, braking means for said part, and means operable during one speed of operation in the series for adjustably presetting the braking means to vary the braking resistance thereof for the next speed of operation in the series and in proportion thereto.

16. In a machine tool having a part to be moved at different speeds, driving means for moving said part, braking means for said part, speed change means for said part including a device movable in one direction to preset it for a certain speed and movable in another direction to actuate said speed change means to obtain said speed, means operable during the movement of said part at one speed for adjustably presetting the braking means to vary the braking resistance thereof during the following speed of movement of said part and in proportion thereto, and a single control member for controlling said device during its latter movement and for controlling said driving means.

17. In a machine tool having a part to be moved at different speeds, driving means for moving said part, braking means for said part, and speed changing means for said part including a device movable in one direction to preset it for a certain speed and movable in another direction to actuate said speed changing means to obtain said speed, said device during its presetting movement operating to adjustably preset the braking means to vary the braking resistance thereof in proportion to said preselected speed and during its speed changing movement to so adjust the braking resistance.

18. In a machine tool having a part to be moved at different speeds, driving means for moving said part, speed changing means for said part, braking means for said part, a device movable in one direction to preselect a certain speed for said part and to adjustably present said braking means to vary the braking resistance thereof, said device being movable in another direction to change the speed of said part to the selected speed and to adjust said braking means to its selected braking resistance, and a single control member for controlling said device during one of its movements.

19. In a machine tool having a part to be moved at different speeds, driving means for moving said part, means operable during the movement of said part at one speed for selecting the following speed of said part and for changing the speed thereof to the selected speed, power means for operating said last-named means to preselect the speed for said part, and a single control member for controlling said driving means and for controlling said preselecting and speed changing means.

20. In a machine tool having a part to be moved at different speeds, driving means for moving said part, braking means for said part, means for changing the speed of said part, a device movable in one direction to preselect the speed for said part and to adjustably preset said braking means to vary the braking resistance thereof, said device being movable in another direction for changing the speed of said part to the selected speed, power means for operating the said device during its first named movement, and a single control member for controlling said driving means and said power means.

21. In a machine tool having a part to be moved at different speeds, driving means for moving said part, speed changing means for said part including a device movable in one direction to preset it for a certain speed and movable in another direction to actuate said speed changing means to obtain said speed, independent power means for moving said device in each direction, and a single control member for controlling said power means and for controlling said driving means.

22. In a machine tool having a part movable at different speeds, driving means for said part, braking means for said part, a member movable in one direction to select the speed for said part and to adjustably preset said braking means to vary the braking resistance thereof, said member being movable in another direction for changing the speed of the part to the selected speed and for giving the desired adjustment to the braking means, independent power means for moving said member in each direction, and a single control member for controlling said power means and member for controlling said power means and said driving means and for applying said braking means.

23. In a machine tool having a part to be moved at different speeds, driving means for moving said part, speed changing means for said part including a device movable in one direction to preset it for a certain speed and movable in another direction to actuate said speed changing means to obtain said speed, a control member for controlling said device during its first named movement, and a second control member for controlling said device during its latter movement and for controlling said driving means.

24. In a machine tool having a part to be moved at different speeds, driving means for said part including a gear train having a plurality of shiftable speed changing elements, shiftable members for shifting said elements, and means having portions engageable with certain of said members for moving two or more of the same sequentially, to shift certain of said elements sequentially, whereby the gear train will be broken at but one point at a time.

25. In a machine tool having a part to be moved at different speeds, a gear train for moving said part and including a plurality of shiftable speed changing elements, shiftable members for shifting said elements, and means movable endwise and having portions engageable during said endwise movement with certain of said members for moving two or more of the same sequentially to shift certain of said elements sequentially whereby the gear train will be broken at but one point at a time.

26. In a machine tool having a part to be moved at different speeds, a driving means for said part including a gear train having a plurality of shiftable speed changing elements, members for shifting said elements, and means for actuating said members, said means having portions engageable with certain of said members for moving two or more of the same sequentially, and said members being so proportioned that when they are thus moved certain of said elements will be shifted in a similar sequence whereby the gear train will be interrupted at but one point at a time.

27. In a machine tool having a part to be moved at different speeds, driving means for moving said part, speed changing means for said part including a plurality of pairs of devices movable in one direction to preset the same for a certain speed and movable in another direction to actuate the said speed changing means to obtain said speed, and a single control member for controlling said devices.

28. In a machine tool having a part to be moved at different speeds, driving means for moving said part, speed changing means for said part including a plurality of devices equally spaced from a common center and movable in one direction to preset the same for a certain speed and movable in another direction to actuate said speed changing means to obtain said speed, and a control member for controlling said devices.

29. In a machine tool having a part to be moved at different speeds, driving means for moving said part, speed changing means for said part and including a plurality of pairs of cooperating devices rotatable to preset the same for a certain speed and linearly movable to actuate said speed changing means to obtain said speed, and a control member controlling said devices.

30. In a machine tool having a part to be moved at different speeds, driving means for moving said part, speed changing means for said part and including a plurality of devices equally spaced with respect to a common center and rotatable to preset the same for a certain speed and linearly movable to actuate said speed changing means to obtain said speed, and a control member controlling said devices.

31. In a machine tool having a part to be moved at different speeds, driving means for moving said part, speed changing means for said part including a plurality of shiftable members having portions equally spaced from a common center, a plurality of devices movable in one direction to preset the same for a certain speed and movable in another direction to actuate said shiftable members to obtain said speed, and a control member for controlling said devices.

32. In a machine tool having a part to be moved at different speeds, driving means for moving said part, a plurality of cooperating pairs of devices, speed changing means for said part including a plurality of shiftable members having portions located between each pair of devices, said devices being movable in one direction to preset the same for a certain speed and movable in another direction to actuate said members to obtain said speed, and a control member for controlling said devices.

33. In a machine tool having a part to be moved at different speeds, driving means for moving said part, a plurality of pairs of cooperating devices equally spaced with respect to a common center, speed changing means for said part including a plurality of shiftable members each having a portion arranged between one of said pairs of devices, said devices being rotatable to preset the same for a certain speed and movable endwise to actuate said shiftable members to obtain said speed, and a control member for controlling said devices.

34. In a machine tool having a part to be moved at different speeds, driving means for moving said part, speed changing means for said part including a device movable in one direction to preset it for a certain speed and movable in another direction to actuate said speed changing means to obtain said speed, locking means for said speed changing means effective during movement of said device in the first named direction, and a control member for controlling said device and said locking means.

35. In a machine tool having a part to be moved at different speeds, driving means for moving said part, speed changing means for said part including a device movable to preset it for a certain speed and to actuate said speed changing means to obtain said speed, locking means for said speed changing means, and a control member for controlling said device and said locking means.

36. In a machine tool having a part to be moved at different speeds, driving means for moving said part, speed changing means for said part including a pair of cooperating devices rotatable and endwise movable away from and toward each other, said devices being rotatable to preset the same for a certain speed and movable endwise toward each other to actuate said speed changing means to obtain said speed, locking means for said speed changing means effective during the endwise movement of said devices away from each other and during the rotatable movement thereof and ineffective during the endwise movement of said devices toward each other, and a control member for controlling said devices and said locking means.

37. In a machine tool having a part to be moved at different speeds, driving means for moving said part, speed changing means for said part including a device movable in one direction to preset it for a certain speed and movable in another direction to actuate said speed changing means to obtain said speed, means for locking said devices against movement in the first named direction, and a control member for controlling said last named means and said devices.

38. In a machine tool having a part to be moved at different speeds, driving means for moving said part, speed changing means for said part including a device movable in one direction to preset it for a certain speed and movable in another direction to actuate said speed changing means to obtain said speed, means for locking said devices against movement in the first named direction, a control member for controlling said last named means and for effecting movement of said devices in said second named direction, and a second control member for effecting movement of said devices in the first named direction.

39. In a machine tool having a part to be moved at different speeds, driving means for moving said part, speed changing means for said part including devices rotatable to preset the same for a certain speed and linearly movable to actuate said speed changing means to obtain said speed, a rotatable dial operatively connected with said devices for rotating the same, means for locking said devices and dial against rotation, and a control member for controlling said last named means and the linear movement of said devices.

40. In a machine tool having a part to be moved at different speeds, driving means for moving said part, speed changing means for said part including a pair of devices movable toward and away from each other, and control means for said devices including links and levers adjustable as to length whereby the desired inward and outward movements of said devices can be obtained.

41. In a machine tool having a part to be moved at different speeds, driving means for moving said part, means operable during the movement of said part at one speed for preselecting the following speed of said part and when said driving means is disconnected from said part for changing the speed thereof to the selected speed, power means for operating said last named means to preselect the speed of said part, and a control member for controlling said power means.

42. In a machine tool having a part to be moved at different speeds, driving means for moving said part, speed changing means for said part including a device movable in one direction to preset it for a certain speed and movable in another direction to actuate said speed changing means to obtain said speed, power means for moving said device in both directions, and means for controlling said power means.

43. In a machine tool having a part to be moved at different speeds, speed changing mechanism for said part including means for preselecting a speed for said part, and means for actuating the mechanism to obtain the preselected speed, power means for operating said preselecting means, a manually operable control member for operating said actuating means, and means for controlling said power means and controlled by said actuating means.

44. In a machine tool having a part to be moved at different speeds, speed changing mechanism for said part including means for preselecting the speed of said part and means for actuating said mechanism to obtain the preselected speed, independent power means for said preselecting means and said actuating means, a control member for one of said power means, and means for controlling the other of said power means through the control of the first named power means.

45. In a machine tool having a part to be moved at different speeds, speed changing mechanism for said part including means for preselecting the speed of said part and means for actuating said mechanism to obtain the preselected speed, power means for operating said preselecting means and including a clutch, and means for operating said clutch by said actuating means.

46. In a machine tool having a part to be moved at different speeds, driving means for moving said part, speed changing means for said part including a device movable in one direction to preset it for a certain speed and movable in another direction to actuate said speed changing means to obtain said speed, and a single control member movable in one direction only for controlling the actuating movements of said device to obtain the preselected speed, said member also controlling said driving means.

47. In a machine tool having a part to be moved at different speeds, driving means for moving said part, speed changing means for said part including shifting mechanism operatively connected to said speed changing means and a device movable in one direction to preset the same for a certain speed and movable in another direction to actuate said mechanism to obtain said speed, and a single control member movable in one direction only for controlling the actuating movement of said device to obtain the preselected speed.

48. In a machine tool having a part to be moved at different speeds, driving means for moving said part, speed changing means for said part including a device movable in one direction to preset it for a certain speed and movable in another direction to actuate said speed changing means to obtain said speed, and a single control member movable in a downward direction only for controlling the actuating movement of said device to obtain the preselected speed, said member also controlling said driving means.

49. In a machine tool having a part to be moved, driving means for moving said part, gear means for connecting and disconnecting said part with said driving means, a device movable in one direction to preset it for disconnecting said gear means with respect to said part and movable in another direction to effect said disconnection, and a control lever for controlling said device during its latter movement.

MAX E. LANGE.